(12) United States Patent
Hamza

(10) Patent No.: US 8,098,901 B2
(45) Date of Patent: Jan. 17, 2012

(54) STANDOFF IRIS RECOGNITION SYSTEM

(75) Inventor: Rida Hamza, Maple Grove, MN (US)

(73) Assignee: Honeywell International Inc., Morristown, NJ (US)

( * ) Notice: Subject to any disclaimer, the term of this patent is extended or adjusted under 35 U.S.C. 154(b) by 1135 days.

(21) Appl. No.: 11/675,424

(22) Filed: Feb. 15, 2007

(65) Prior Publication Data

US 2007/0140531 A1 Jun. 21, 2007

Related U.S. Application Data

(63) Continuation-in-part of application No. 11/275,703, filed on Jan. 25, 2006, now Pat. No. 7,593,550, application No. 11/675,424, and a continuation-in-part of application No. 11/672,108, filed on Feb. 7, 2007, and a continuation-in-part of application No. 11/372,854, filed on Mar. 10, 2006, and a continuation-in-part of application No. 11/043,366, filed on Jan. 26, 2005.

(60) Provisional application No. 60/647,270, filed on Jan. 26, 2005, provisional application No. 60/778,770, filed on Mar. 3, 2006.

(51) Int. Cl.
*G06K 9/00* (2006.01)
(52) U.S. Cl. .................................................. 382/117
(58) Field of Classification Search .................. 382/115, 382/117, 118, 103; 356/4.03, 4.04, 4.05, 356/4.06, 4.07, 18, 492, 493, 496, 498
See application file for complete search history.

(56) References Cited

U.S. PATENT DOCUMENTS

| 4,641,349 A | 2/1987 | Flom et al. |
| 4,836,670 A | 6/1989 | Hutchinson |
| 5,231,674 A | 7/1993 | Cleveland et al. |
| 5,291,560 A | 3/1994 | Daugman |
| 5,293,427 A | 3/1994 | Ueno et al. |
| 5,359,382 A | 10/1994 | Uenaka |
| 5,404,013 A | 4/1995 | Tajima |

(Continued)

FOREIGN PATENT DOCUMENTS

EP 0484076 5/1992

(Continued)

OTHER PUBLICATIONS

Daugman, "How Iris Recognition Works," IEEE pp. 21-30, Jan. 2004.

(Continued)

*Primary Examiner* — Brian Q Le
(74) *Attorney, Agent, or Firm* — Seager, Tufte & Wickhem, LLC

(57) ABSTRACT

An iris recognition system having pupil and iris border conditioning prior to iris mapping and analysis. The system may obtain and filter an image of an eye. A pupil of the mage may be selected and segmented. Portions of the pupil border can be evaluated and pruned. A curve may be fitted on at least the invalid portions of the pupil border. The iris of the eye with an acceptable border of the pupil as an inside border of the iris may be selected from the image. The iris outside border having sclera and eyelash/lid boundaries may be grouped using a cluster angular range based on eye symmetry. The sclera boundaries may be fitted with a curve. The eyelash/lid boundaries may be extracted or masked. The iris may be segmented, mapped and analyzed.

15 Claims, 13 Drawing Sheets

U.S. PATENT DOCUMENTS

| | | |
|---|---|---|
| 5,551,027 A | 8/1996 | Choy et al. |
| 5,572,596 A | 11/1996 | Wildes et al. |
| 5,608,472 A | 3/1997 | Szirth et al. |
| 5,664,239 A | 9/1997 | Nakata |
| 5,717,512 A | 2/1998 | Chmielewski, Jr. et al. |
| 5,751,836 A | 5/1998 | Wildes et al. |
| 5,859,686 A | 1/1999 | Aboutalib et al. |
| 5,860,032 A | 1/1999 | Iwane |
| 5,896,174 A | 4/1999 | Nakata |
| 5,901,238 A | 5/1999 | Matsushita |
| 5,909,269 A | 6/1999 | Isogai et al. |
| 5,953,440 A | 9/1999 | Zhang et al. |
| 5,956,122 A | 9/1999 | Doster |
| 5,978,494 A | 11/1999 | Zhang |
| 6,005,704 A | 12/1999 | Chmielewski, Jr. et al. |
| 6,007,202 A | 12/1999 | Apple et al. |
| 6,012,376 A | 1/2000 | Hanke et al. |
| 6,021,210 A | 2/2000 | Camus et al. |
| 6,028,949 A | 2/2000 | McKendall |
| 6,055,322 A | 4/2000 | Salganicoff et al. |
| 6,064,752 A | 5/2000 | Rozmus et al. |
| 6,069,967 A | 5/2000 | Rozmus et al. |
| 6,081,607 A | 6/2000 | Mori et al. |
| 6,088,470 A | 7/2000 | Camus et al. |
| 6,091,899 A | 7/2000 | Konishi et al. |
| 6,101,477 A | 8/2000 | Hohle et al. |
| 6,104,431 A | 8/2000 | Inoue et al. |
| 6,108,636 A | 8/2000 | Yap et al. |
| 6,119,096 A | 9/2000 | Mann et al. |
| 6,120,461 A | 9/2000 | Smyth |
| 6,134,339 A | 10/2000 | Luo |
| 6,144,754 A | 11/2000 | Okano et al. |
| 6,246,751 B1 | 6/2001 | Bergl et al. |
| 6,247,813 B1 | 6/2001 | Kim et al. |
| 6,252,977 B1 | 6/2001 | Salganicoff et al. |
| 6,282,475 B1 | 8/2001 | Washington |
| 6,285,505 B1 | 9/2001 | Melville et al. |
| 6,285,780 B1 | 9/2001 | Yamakita et al. |
| 6,289,113 B1 | 9/2001 | McHugh et al. |
| 6,299,306 B1 | 10/2001 | Braithwaite et al. |
| 6,308,015 B1 | 10/2001 | Matsumoto |
| 6,309,069 B1 | 10/2001 | Seal et al. |
| 6,320,610 B1 | 11/2001 | Van Sant et al. |
| 6,320,612 B1 | 11/2001 | Young |
| 6,320,973 B2 | 11/2001 | Suzaki et al. |
| 6,323,761 B1 | 11/2001 | Son |
| 6,325,765 B1 | 12/2001 | Hay et al. |
| 6,330,674 B1 | 12/2001 | Angelo et al. |
| 6,332,193 B1 | 12/2001 | Glass et al. |
| 6,344,683 B1 | 2/2002 | Kim |
| 6,370,260 B1 | 4/2002 | Pavlidis et al. |
| 6,377,699 B1 | 4/2002 | Musgrave et al. |
| 6,393,136 B1 | 5/2002 | Amir et al. |
| 6,400,835 B1 | 6/2002 | Lemelson et al. |
| 6,424,727 B1 | 7/2002 | Musgrave et al. |
| 6,424,845 B1 | 7/2002 | Emmoft et al. |
| 6,433,818 B1 | 8/2002 | Steinberg et al. |
| 6,438,752 B1 | 8/2002 | McClard |
| 6,441,482 B1 | 8/2002 | Foster |
| 6,446,045 B1 | 9/2002 | Stone et al. |
| 6,483,930 B1 | 11/2002 | Musgrave et al. |
| 6,484,936 B1 | 11/2002 | Nicoll et al. |
| 6,490,443 B1 | 12/2002 | Freeny, Jr. |
| 6,493,363 B1 | 12/2002 | Weaver et al. |
| 6,493,669 B1 | 12/2002 | Curry et al. |
| 6,494,363 B1 | 12/2002 | Roger et al. |
| 6,503,163 B1 | 1/2003 | Van Sant et al. |
| 6,505,193 B1 | 1/2003 | Musgrave et al. |
| 6,506,078 B1 | 1/2003 | Mori et al. |
| 6,508,397 B1 | 1/2003 | Do |
| 6,516,078 B1 | 2/2003 | Yang et al. |
| 6,516,087 B1 | 2/2003 | Camus |
| 6,516,416 B2 | 2/2003 | Gregg et al. |
| 6,522,772 B1 | 2/2003 | Morrison et al. |
| 6,523,165 B2 | 2/2003 | Liu et al. |
| 6,526,160 B1 | 2/2003 | Ito |
| 6,532,298 B1 | 3/2003 | Cambier et al. |
| 6,540,392 B1 | 4/2003 | Braithwaite |
| 6,542,624 B1 | 4/2003 | Oda |
| 6,546,121 B1 | 4/2003 | Oda |
| 6,553,494 B1 | 4/2003 | Glass |
| 6,580,356 B1 | 6/2003 | Alt et al. |
| 6,591,001 B1 | 7/2003 | Oda et al. |
| 6,591,064 B2 | 7/2003 | Higashiyama et al. |
| 6,594,377 B1 | 7/2003 | Kim et al. |
| 6,594,399 B1 | 7/2003 | Camus et al. |
| 6,598,971 B2 | 7/2003 | Cleveland |
| 6,600,878 B2 | 7/2003 | Pregara |
| 6,614,919 B1 * | 9/2003 | Suzaki et al. ................. 382/117 |
| 6,652,099 B2 | 11/2003 | Chae et al. |
| 6,674,367 B2 | 1/2004 | Sweatte |
| 6,690,997 B2 | 2/2004 | Rivalto |
| 6,708,176 B2 | 3/2004 | Strunk et al. |
| 6,711,562 B1 | 3/2004 | Ross et al. |
| 6,714,665 B1 | 3/2004 | Hanna et al. |
| 6,718,049 B2 | 4/2004 | Pavlidis et al. |
| 6,718,665 B2 | 4/2004 | Hess et al. |
| 6,732,278 B2 | 5/2004 | Baird, III et al. |
| 6,734,783 B1 | 5/2004 | Anbai |
| 6,745,520 B2 | 6/2004 | Puskaric et al. |
| 6,750,435 B2 | 6/2004 | Ford |
| 6,751,733 B1 | 6/2004 | Nakamura et al. |
| 6,753,919 B1 | 6/2004 | Daugman |
| 6,754,640 B2 | 6/2004 | Bozeman |
| 6,760,467 B1 | 7/2004 | Min et al. |
| 6,765,470 B2 | 7/2004 | Shinzaki |
| 6,766,041 B2 | 7/2004 | Golden et al. |
| 6,775,774 B1 | 8/2004 | Harper |
| 6,785,406 B1 | 8/2004 | Kamada |
| 6,793,134 B2 | 9/2004 | Clark |
| 6,819,219 B1 | 11/2004 | Bolle et al. |
| 6,829,370 B1 | 12/2004 | Pavlidis et al. |
| 6,832,044 B2 | 12/2004 | Doi et al. |
| 6,836,554 B1 | 12/2004 | Bolle et al. |
| 6,837,436 B2 | 1/2005 | Swartz et al. |
| 6,845,479 B2 | 1/2005 | Illman |
| 6,853,444 B2 | 2/2005 | Haddad |
| 6,867,683 B2 | 3/2005 | Calvesio et al. |
| 6,873,960 B1 | 3/2005 | Wood et al. |
| 6,896,187 B2 | 5/2005 | Stockhammer |
| 6,905,411 B2 | 6/2005 | Nguyen et al. |
| 6,920,237 B2 | 7/2005 | Chen et al. |
| 6,930,707 B2 | 8/2005 | Bates et al. |
| 6,934,849 B2 | 8/2005 | Kramer et al. |
| 6,950,139 B2 | 9/2005 | Fujinawa |
| 6,954,738 B2 | 10/2005 | Wang et al. |
| 6,957,341 B2 | 10/2005 | Rice et al. |
| 6,972,797 B2 | 12/2005 | Izumi |
| 6,992,562 B2 | 1/2006 | Fuks et al. |
| 7,053,948 B2 | 5/2006 | Konishi |
| 7,071,971 B2 | 7/2006 | Elberbaum |
| 7,084,904 B2 | 8/2006 | Liu et al. |
| 7,136,581 B2 | 11/2006 | Fujii |
| 7,183,895 B2 | 2/2007 | Bazakos et al. |
| 7,184,577 B2 | 2/2007 | Chen et al. |
| 7,197,173 B2 | 3/2007 | Jones et al. |
| 7,204,425 B2 | 4/2007 | Mosher, Jr. et al. |
| 7,277,561 B2 | 10/2007 | Shin |
| 7,277,891 B2 | 10/2007 | Howard et al. |
| 7,298,873 B2 | 11/2007 | Miller, Jr. et al. |
| 7,315,233 B2 | 1/2008 | Yuhara |
| 7,362,210 B2 | 4/2008 | Bazakos et al. |
| 7,362,370 B2 | 4/2008 | Sakamoto et al. |
| 7,362,884 B2 | 4/2008 | Willis et al. |
| 7,365,771 B2 | 4/2008 | Kahn et al. |
| 7,406,184 B2 | 7/2008 | Wolff et al. |
| 7,414,648 B2 | 8/2008 | Imada |
| 7,417,682 B2 | 8/2008 | Kuwakino et al. |
| 7,418,115 B2 | 8/2008 | Northcott et al. |
| 7,421,097 B2 | 9/2008 | Hamza et al. |
| 7,443,441 B2 | 10/2008 | Hiraoka |
| 7,460,693 B2 | 12/2008 | Loy et al. |
| 7,471,451 B2 | 12/2008 | Dent et al. |
| 7,486,806 B2 | 2/2009 | Azuma et al. |
| 7,518,651 B2 | 4/2009 | Butterworth |
| 7,537,568 B2 | 5/2009 | Moehring |
| 7,538,326 B2 | 5/2009 | Johnson et al. |

| | | |
|---|---|---|
| 7,542,945 B2 | 6/2009 | Thompson et al. |
| 7,580,620 B2 | 8/2009 | Raskar et al. |
| 7,593,550 B2 | 9/2009 | Hamza |
| 7,639,846 B2 | 12/2009 | Yoda |
| 7,722,461 B2 | 5/2010 | Gatto et al. |
| 7,751,598 B2 | 7/2010 | Matey et al. |
| 7,756,301 B2 | 7/2010 | Hamza |
| 7,756,407 B2 | 7/2010 | Raskar |
| 7,761,453 B2 | 7/2010 | Hamza |
| 7,777,802 B2 | 8/2010 | Shinohara et al. |
| 7,804,982 B2 | 9/2010 | Howard et al. |
| 2001/0026632 A1 | 10/2001 | Tamai |
| 2001/0027116 A1 | 10/2001 | Baird |
| 2001/0047479 A1 | 11/2001 | Bromba et al. |
| 2001/0051924 A1 | 12/2001 | Uberti |
| 2001/0054154 A1 | 12/2001 | Tam |
| 2002/0010857 A1 | 1/2002 | Karthik |
| 2002/0033896 A1 | 3/2002 | Hatano |
| 2002/0039433 A1 | 4/2002 | Shin |
| 2002/0040434 A1 | 4/2002 | Elliston et al. |
| 2002/0062280 A1 | 5/2002 | Zachariassen et al. |
| 2002/0077841 A1 | 6/2002 | Thompson |
| 2002/0089157 A1 | 7/2002 | Breed et al. |
| 2002/0106113 A1 | 8/2002 | Park |
| 2002/0112177 A1 | 8/2002 | Voltmer et al. |
| 2002/0114495 A1 | 8/2002 | Chen et al. |
| 2002/0130961 A1 | 9/2002 | Lee et al. |
| 2002/0131622 A1 | 9/2002 | Lee et al. |
| 2002/0139842 A1 | 10/2002 | Swaine |
| 2002/0140715 A1 | 10/2002 | Smet |
| 2002/0142844 A1 | 10/2002 | Kerr |
| 2002/0144128 A1 | 10/2002 | Rahman et al. |
| 2002/0150281 A1 | 10/2002 | Cho |
| 2002/0154794 A1 | 10/2002 | Cho |
| 2002/0158750 A1 | 10/2002 | Almalik |
| 2002/0164054 A1 | 11/2002 | McCartney et al. |
| 2002/0175182 A1 | 11/2002 | Matthews |
| 2002/0186131 A1 | 12/2002 | Fettis |
| 2002/0191075 A1 | 12/2002 | Doi et al. |
| 2002/0191076 A1 | 12/2002 | Wada et al. |
| 2002/0194128 A1 | 12/2002 | Maritzen et al. |
| 2002/0194131 A1 | 12/2002 | Dick |
| 2002/0198731 A1 | 12/2002 | Barnes et al. |
| 2003/0002714 A1 | 1/2003 | Wakiyama |
| 2003/0012413 A1 | 1/2003 | Kusakari et al. |
| 2003/0014372 A1 | 1/2003 | Wheeler et al. |
| 2003/0020828 A1 | 1/2003 | Ooi et al. |
| 2003/0038173 A1 | 2/2003 | Blackson et al. |
| 2003/0046228 A1 | 3/2003 | Berney |
| 2003/0053663 A1 | 3/2003 | Chen et al. |
| 2003/0055689 A1 | 3/2003 | Block et al. |
| 2003/0055787 A1 | 3/2003 | Fujii |
| 2003/0058492 A1 | 3/2003 | Wakiyama |
| 2003/0061172 A1 | 3/2003 | Robinson |
| 2003/0061233 A1 | 3/2003 | Manasse et al. |
| 2003/0065626 A1 | 4/2003 | Allen |
| 2003/0071743 A1 | 4/2003 | Seah et al. |
| 2003/0072475 A1 | 4/2003 | Tamori |
| 2003/0073499 A1 | 4/2003 | Reece |
| 2003/0074317 A1 | 4/2003 | Hofi |
| 2003/0074326 A1 | 4/2003 | Byers |
| 2003/0076161 A1 | 4/2003 | Tisse |
| 2003/0076300 A1 | 4/2003 | Lauper et al. |
| 2003/0076984 A1 | 4/2003 | Tisse et al. |
| 2003/0080194 A1 | 5/2003 | O'Hara et al. |
| 2003/0091215 A1 | 5/2003 | Lauper et al. |
| 2003/0092489 A1 | 5/2003 | Veradej |
| 2003/0095689 A1 | 5/2003 | Volkommer et al. |
| 2003/0098776 A1 | 5/2003 | Friedli |
| 2003/0099379 A1 | 5/2003 | Monk et al. |
| 2003/0099381 A1 | 5/2003 | Ohba |
| 2003/0103652 A1 | 6/2003 | Lee et al. |
| 2003/0107097 A1 | 6/2003 | McArthur et al. |
| 2003/0107645 A1 | 6/2003 | Yoon |
| 2003/0108224 A1 | 6/2003 | Ike |
| 2003/0108225 A1 | 6/2003 | Li |
| 2003/0115148 A1 | 6/2003 | Takhar |
| 2003/0115459 A1 | 6/2003 | Monk |
| 2003/0116630 A1 | 6/2003 | Carey et al. |
| 2003/0118212 A1 | 6/2003 | Min et al. |
| 2003/0118217 A1 | 6/2003 | Kondo et al. |
| 2003/0123711 A1 | 7/2003 | Kim et al. |
| 2003/0125054 A1 | 7/2003 | Garcia |
| 2003/0125057 A1 | 7/2003 | Pesola |
| 2003/0126560 A1 | 7/2003 | Kurapati et al. |
| 2003/0131245 A1 | 7/2003 | Linderman |
| 2003/0131265 A1 | 7/2003 | Bhakta |
| 2003/0133597 A1 | 7/2003 | Moore et al. |
| 2003/0140235 A1 | 7/2003 | Immega et al. |
| 2003/0140928 A1 | 7/2003 | Bui et al. |
| 2003/0141411 A1 | 7/2003 | Pandya et al. |
| 2003/0149881 A1 | 8/2003 | Patel et al. |
| 2003/0152251 A1 | 8/2003 | Ike |
| 2003/0152252 A1 | 8/2003 | Kondo et al. |
| 2003/0156741 A1 | 8/2003 | Lee et al. |
| 2003/0158762 A1 | 8/2003 | Wu |
| 2003/0158821 A1 | 8/2003 | Maia |
| 2003/0159051 A1 | 8/2003 | Hollnagel |
| 2003/0163739 A1 | 8/2003 | Armington et al. |
| 2003/0169334 A1 | 9/2003 | Braithwaite et al. |
| 2003/0169901 A1 | 9/2003 | Pavlidis et al. |
| 2003/0169907 A1 | 9/2003 | Edwards et al. |
| 2003/0173408 A1 | 9/2003 | Mosher, Jr. et al. |
| 2003/0174049 A1 | 9/2003 | Beigel et al. |
| 2003/0177051 A1 | 9/2003 | Driscoll et al. |
| 2003/0182151 A1 | 9/2003 | Taslitz |
| 2003/0182182 A1 | 9/2003 | Kocher |
| 2003/0189480 A1 | 10/2003 | Hamid |
| 2003/0189481 A1 | 10/2003 | Hamid |
| 2003/0191949 A1 | 10/2003 | Odagawa |
| 2003/0194112 A1 | 10/2003 | Lee |
| 2003/0195935 A1 | 10/2003 | Leeper |
| 2003/0198368 A1 | 10/2003 | Kee |
| 2003/0200180 A1 | 10/2003 | Phelan, III et al. |
| 2003/0210139 A1 | 11/2003 | Brooks et al. |
| 2003/0210802 A1 | 11/2003 | Schuessier |
| 2003/0218719 A1 | 11/2003 | Abourizk et al. |
| 2003/0225711 A1 | 12/2003 | Paping |
| 2003/0228898 A1 | 12/2003 | Rowe |
| 2003/0233556 A1 | 12/2003 | Angelo et al. |
| 2003/0235326 A1 | 12/2003 | Morikawa et al. |
| 2003/0235411 A1 | 12/2003 | Morikawa et al. |
| 2003/0236120 A1 | 12/2003 | Reece et al. |
| 2004/0001614 A1 | 1/2004 | Russon et al. |
| 2004/0002894 A1 | 1/2004 | Kocher |
| 2004/0005078 A1 | 1/2004 | Tillotson |
| 2004/0006553 A1 | 1/2004 | de Vries et al. |
| 2004/0010462 A1 | 1/2004 | Moon et al. |
| 2004/0012760 A1 | 1/2004 | Mihashi et al. |
| 2004/0019570 A1 | 1/2004 | Bolle et al. |
| 2004/0023664 A1 | 2/2004 | Mirouze et al. |
| 2004/0023709 A1 | 2/2004 | Beaulieu et al. |
| 2004/0025030 A1 | 2/2004 | Corbett-Clark et al. |
| 2004/0025031 A1 | 2/2004 | Ooi et al. |
| 2004/0025053 A1 | 2/2004 | Hayward |
| 2004/0029564 A1 | 2/2004 | Hodge |
| 2004/0030930 A1 | 2/2004 | Nomura |
| 2004/0035123 A1 | 2/2004 | Kim et al. |
| 2004/0037450 A1 | 2/2004 | Bradski |
| 2004/0039914 A1 | 2/2004 | Barr et al. |
| 2004/0042641 A1 | 3/2004 | Jakubowski |
| 2004/0044627 A1 | 3/2004 | Russell et al. |
| 2004/0046640 A1 | 3/2004 | Jourdain et al. |
| 2004/0049687 A1 | 3/2004 | Orsini et al. |
| 2004/0050924 A1 | 3/2004 | Mletzko et al. |
| 2004/0050930 A1 | 3/2004 | Rowe |
| 2004/0052405 A1 | 3/2004 | Walfridsson |
| 2004/0052418 A1 | 3/2004 | DeLean |
| 2004/0059590 A1 | 3/2004 | Mercredi et al. |
| 2004/0059953 A1 | 3/2004 | Purnell |
| 2004/0104266 A1 | 6/2004 | Bolle et al. |
| 2004/0117636 A1 | 6/2004 | Cheng |
| 2004/0133804 A1 | 7/2004 | Smith et al. |
| 2004/0146187 A1 | 7/2004 | Jeng |
| 2004/0148526 A1 | 7/2004 | Sands et al. |
| 2004/0160518 A1 | 8/2004 | Park |
| 2004/0162870 A1 | 8/2004 | Matsuzaki et al. |
| 2004/0162984 A1 | 8/2004 | Freeman et al. |

| | | | | | |
|---|---|---|---|---|---|
| 2004/0169817 A1 | 9/2004 | Grotehusmann et al. | EP | 0962894 | 12/1999 |
| 2004/0172541 A1 | 9/2004 | Ando et al. | EP | 1018297 | 7/2000 |
| 2004/0174070 A1 | 9/2004 | Voda et al. | EP | 1024463 | 8/2000 |
| 2004/0190759 A1 | 9/2004 | Caldwell | EP | 1028398 | 8/2000 |
| 2004/0193893 A1 | 9/2004 | Braithwaite et al. | EP | 1041506 | 10/2000 |
| 2004/0219902 A1 | 11/2004 | Lee et al. | EP | 1041523 | 10/2000 |
| 2004/0233038 A1 | 11/2004 | Beenau et al. | EP | 1126403 | 8/2001 |
| 2004/0240711 A1 | 12/2004 | Hamza et al. | EP | 1139270 | 10/2001 |
| 2004/0252866 A1 | 12/2004 | Tisse et al. | EP | 1237117 | 9/2002 |
| 2004/0255168 A1 | 12/2004 | Murashita et al. | EP | 1477925 | 11/2004 |
| 2005/0008200 A1 | 1/2005 | Azuma et al. | EP | 1635307 | 3/2006 |
| 2005/0008201 A1 | 1/2005 | Lee et al. | GB | 2369205 | 5/2002 |
| 2005/0012817 A1 | 1/2005 | Hampapur et al. | GB | 2371396 | 7/2002 |
| 2005/0029353 A1 | 2/2005 | Isemura et al. | GB | 2375913 | 11/2002 |
| 2005/0052566 A1 | 3/2005 | Kato | GB | 2402840 | 12/2004 |
| 2005/0055582 A1 | 3/2005 | Bazakos et al. | GB | 2411980 | 9/2005 |
| 2005/0063567 A1 | 3/2005 | Saitoh et al. | JP | 9161135 | 6/1997 |
| 2005/0084137 A1 | 4/2005 | Kim et al. | JP | 9198545 | 7/1997 |
| 2005/0084179 A1 | 4/2005 | Hanna et al. | JP | 9201348 | 8/1997 |
| 2005/0099288 A1 | 5/2005 | Spitz et al. | JP | 9147233 | 9/1997 |
| 2005/0102502 A1 | 5/2005 | Sagen | JP | 9234264 | 9/1997 |
| 2005/0110610 A1 | 5/2005 | Bazakos et al. | JP | 9305765 | 11/1997 |
| 2005/0125258 A1 | 6/2005 | Yellin et al. | JP | 9319927 | 12/1997 |
| 2005/0127161 A1 | 6/2005 | Smith et al. | JP | 10021392 | 1/1998 |
| 2005/0129286 A1 | 6/2005 | Hekimian | JP | 10040386 | 2/1998 |
| 2005/0134796 A1 | 6/2005 | Zelvin et al. | JP | 10049728 | 2/1998 |
| 2005/0138385 A1 | 6/2005 | Friedli et al. | JP | 10137219 | 5/1998 |
| 2005/0138387 A1 | 6/2005 | Lam et al. | JP | 10137221 | 5/1998 |
| 2005/0146640 A1 | 7/2005 | Shibata | JP | 10137222 | 5/1998 |
| 2005/0151620 A1 | 7/2005 | Neumann | JP | 10137223 | 5/1998 |
| 2005/0152583 A1 | 7/2005 | Kondo et al. | JP | 10248827 | 9/1998 |
| 2005/0193212 A1 | 9/2005 | Yuhara | JP | 10269183 | 10/1998 |
| 2005/0199708 A1 | 9/2005 | Friedman | JP | 11047117 | 2/1999 |
| 2005/0206501 A1 | 9/2005 | Farhat | JP | 11089820 | 4/1999 |
| 2005/0206502 A1 | 9/2005 | Bernitz | JP | 11200684 | 7/1999 |
| 2005/0207614 A1* | 9/2005 | Schonberg et al. ........... 382/100 | JP | 11203478 | 7/1999 |
| 2005/0210267 A1 | 9/2005 | Sugano et al. | JP | 11213047 | 8/1999 |
| 2005/0210270 A1 | 9/2005 | Rohatgi et al. | JP | 11339037 | 12/1999 |
| 2005/0210271 A1 | 9/2005 | Chou et al. | JP | 2000005149 | 1/2000 |
| 2005/0238214 A1 | 10/2005 | Matsuda et al. | JP | 2000005150 | 1/2000 |
| 2005/0240778 A1 | 10/2005 | Saito | JP | 2000011163 | 1/2000 |
| 2005/0248725 A1 | 11/2005 | Ikoma et al. | JP | 2000023946 | 1/2000 |
| 2005/0249385 A1 | 11/2005 | Kondo et al. | JP | 2000083930 | 3/2000 |
| 2005/0255840 A1 | 11/2005 | Markham | JP | 2000102510 | 4/2000 |
| 2006/0093190 A1 | 5/2006 | Cheng et al. | JP | 2000102524 | 4/2000 |
| 2006/0147094 A1* | 7/2006 | Yoo .............................. 382/117 | JP | 2000105830 | 4/2000 |
| 2006/0165266 A1 | 7/2006 | Hamza | JP | 2000107156 | 4/2000 |
| 2006/0274919 A1 | 12/2006 | LoIacono et al. | JP | 2000139878 | 5/2000 |
| 2007/0036397 A1 | 2/2007 | Hamza | JP | 2000155863 | 6/2000 |
| 2007/0160266 A1 | 7/2007 | Jones et al. | JP | 2000182050 | 6/2000 |
| 2007/0189582 A1 | 8/2007 | Hamza et al. | JP | 2000185031 | 7/2000 |
| 2007/0206840 A1 | 9/2007 | Jacobson | JP | 2000194972 | 7/2000 |
| 2007/0211924 A1 | 9/2007 | Hamza | JP | 2000237167 | 9/2000 |
| 2007/0274570 A1 | 11/2007 | Hamza | JP | 2000242788 | 9/2000 |
| 2007/0274571 A1 | 11/2007 | Hamza | JP | 2000259817 | 9/2000 |
| 2007/0286590 A1 | 12/2007 | Terashima | JP | 2000356059 | 12/2000 |
| 2008/0005578 A1 | 1/2008 | Shafir | JP | 2000357232 | 12/2000 |
| 2008/0075334 A1 | 3/2008 | Determan et al. | JP | 2001005948 | 1/2001 |
| 2008/0075441 A1 | 3/2008 | Jelinek et al. | JP | 2001067399 | 3/2001 |
| 2008/0104415 A1 | 5/2008 | Palti-Wasserman et al. | JP | 2001101429 | 4/2001 |
| 2008/0148030 A1 | 6/2008 | Goffin | JP | 2001167275 | 6/2001 |
| 2008/0211347 A1 | 9/2008 | Wright et al. | JP | 2001222661 | 8/2001 |
| 2008/0252412 A1 | 10/2008 | Larsson et al. | JP | 2001292981 | 10/2001 |
| 2008/0267456 A1 | 10/2008 | Anderson | JP | 2001297177 | 10/2001 |
| 2009/0046899 A1 | 2/2009 | Northcott et al. | JP | 2001358987 | 12/2001 |
| 2009/0092283 A1 | 4/2009 | Whillock et al. | JP | 2002119477 | 4/2002 |
| 2009/0316993 A1 | 12/2009 | Brasnett et al. | JP | 2002133415 | 5/2002 |
| 2010/0002913 A1 | 1/2010 | Hamza | JP | 2002153444 | 5/2002 |
| 2010/0033677 A1 | 2/2010 | Jelinek | JP | 2002153445 | 5/2002 |
| 2010/0034529 A1 | 2/2010 | Jelinek | JP | 2002260071 | 9/2002 |
| 2010/0142765 A1 | 6/2010 | Hamza | JP | 2002271689 | 9/2002 |
| 2010/0182440 A1 | 7/2010 | McCloskey | JP | 2002286650 | 10/2002 |
| 2010/0239119 A1 | 9/2010 | Bazakos et al. | JP | 2002312772 | 10/2002 |
| | | | JP | 2002329204 | 11/2002 |
| FOREIGN PATENT DOCUMENTS | | | JP | 2003006628 | 1/2003 |
| EP | 0593386 | 4/1994 | JP | 2003036434 | 2/2003 |
| EP | 0878780 | 11/1998 | JP | 2003108720 | 4/2003 |
| EP | 0899680 | 3/1999 | JP | 2003108983 | 4/2003 |
| EP | 0910986 | 4/1999 | JP | 2003132355 | 5/2003 |

| | | |
|---|---|---|
| JP | 2003150942 | 5/2003 |
| JP | 2003153880 | 5/2003 |
| JP | 2003242125 | 8/2003 |
| JP | 2003271565 | 9/2003 |
| JP | 2003271940 | 9/2003 |
| JP | 2003308522 | 10/2003 |
| JP | 2003308523 | 10/2003 |
| JP | 2003317102 | 11/2003 |
| JP | 2003331265 | 11/2003 |
| JP | 2004005167 | 1/2004 |
| JP | 2004021406 | 1/2004 |
| JP | 2004030334 | 1/2004 |
| JP | 2004038305 | 2/2004 |
| JP | 2004094575 | 3/2004 |
| JP | 2004152046 | 5/2004 |
| JP | 2004163356 | 6/2004 |
| JP | 2004164483 | 6/2004 |
| JP | 2004171350 | 6/2004 |
| JP | 2004171602 | 6/2004 |
| JP | 2004206444 | 7/2004 |
| JP | 2004220376 | 8/2004 |
| JP | 2004261515 | 9/2004 |
| JP | 2004280221 | 10/2004 |
| JP | 2004280547 | 10/2004 |
| JP | 2004287621 | 10/2004 |
| JP | 2004315127 | 11/2004 |
| JP | 2004318248 | 11/2004 |
| JP | 2005004524 | 1/2005 |
| JP | 2005011207 | 1/2005 |
| JP | 2005025577 | 1/2005 |
| JP | 2005038257 | 2/2005 |
| JP | 2005062990 | 3/2005 |
| JP | 2005115961 | 4/2005 |
| JP | 2005148883 | 6/2005 |
| JP | 2005242677 | 9/2005 |
| WO | WO 97/17674 | 5/1997 |
| WO | WO 97/21188 | 6/1997 |
| WO | WO 98/02083 | 1/1998 |
| WO | WO 98/08439 | 3/1998 |
| WO | WO 99/32317 | 7/1999 |
| WO | WO 99/52422 | 10/1999 |
| WO | WO 99/65175 | 12/1999 |
| WO | WO 00/28484 | 5/2000 |
| WO | WO 00/29986 | 5/2000 |
| WO | WO 00/31677 | 6/2000 |
| WO | WO 00/36605 | 6/2000 |
| WO | WO 00/62239 | 10/2000 |
| WO | WO 01/01329 | 1/2001 |
| WO | WO 01/03100 | 1/2001 |
| WO | WO 01/28476 | 4/2001 |
| WO | WO 01/35348 | 5/2001 |
| WO | WO 01/35349 | 5/2001 |
| WO | WO 01/40982 | 6/2001 |
| WO | WO 01/63994 | 8/2001 |
| WO | WO 01/69490 | 9/2001 |
| WO | WO 01/86599 | 11/2001 |
| WO | WO 02/01451 | 1/2002 |
| WO | WO 02/19030 | 3/2002 |
| WO | WO 02/35452 | 5/2002 |
| WO | WO 02/35480 | 5/2002 |
| WO | WO 02/091735 | 11/2002 |
| WO | WO 02/095657 | 11/2002 |
| WO | WO 03/002387 | 1/2003 |
| WO | WO 03/003910 | 1/2003 |
| WO | WO 03/054777 | 7/2003 |
| WO | WO 03/077077 | 9/2003 |
| WO | WO 2004/029863 | 4/2004 |
| WO | WO 2004/042646 | 5/2004 |
| WO | WO 2004/055737 | 7/2004 |
| WO | WO 2004/089214 | 10/2004 |
| WO | WO 2004/097743 | 11/2004 |
| WO | WO 2005/008567 | 1/2005 |
| WO | WO 2005/013181 | 2/2005 |
| WO | WO 2005/024698 | 3/2005 |
| WO | WO 2005/024708 | 3/2005 |
| WO | WO 2005/024709 | 3/2005 |
| WO | WO 2005/029388 | 3/2005 |
| WO | WO 2005/062235 | 7/2005 |
| WO | WO 2005/069252 | 7/2005 |
| WO | WO 2005/093510 | 10/2005 |
| WO | WO 2005/093681 | 10/2005 |
| WO | WO 2005/096962 | 10/2005 |
| WO | WO 2005/098531 | 10/2005 |
| WO | WO 2005/104704 | 11/2005 |
| WO | WO 2005/109344 | 11/2005 |
| WO | WO 2006/012645 | 2/2006 |
| WO | WO 2006/023046 | 3/2006 |
| WO | WO 2006/051462 | 5/2006 |
| WO | WO 2006/063076 | 6/2006 |
| WO | 2006081209 | 8/2006 |
| WO | WO 2006/081505 | 8/2006 |
| WO | WO 2007/101269 | 9/2007 |
| WO | WO 2007/101275 | 9/2007 |
| WO | WO 2007/101276 | 9/2007 |
| WO | WO 2007/103698 | 9/2007 |
| WO | WO 2007/103701 | 9/2007 |
| WO | WO 2007/103833 | 9/2007 |
| WO | WO 2007/103834 | 9/2007 |
| WO | WO 2008/016724 | 2/2008 |
| WO | WO 2008/019168 | 2/2008 |
| WO | WO 2008/019169 | 2/2008 |
| WO | WO 2008/021584 | 2/2008 |
| WO | WO 2008/031089 | 3/2008 |
| WO | WO 2008/040026 | 4/2008 |

OTHER PUBLICATIONS

Kawaguchi et al., "Detection of Eyes from Human Faces by Hough Transform and Separability Filter," IEEE, pp. 49-52, 2000.
Kong et al., "Detecting Eyelash and Reflection for Accurate Iris Segmentation," International Journal of Pattern Recognition and Artificial Intelligence, vol. 17, No. 6, pp. 1025-1034, 2003.
Suzaki et al., "A Horse Identification System Using Biometrics," Systems and Computers in Japan, vol. 32, No. 14, pp. 12-23, 2001.
Trucco et al., "Robust iris location in close-up images of the eye," Pattern Anal Appliic. 8: pp. 247-255, 2005.
Avcibas et al., "Steganalysis Using Image Quality Metrics," IEEE Transactions on Image Processing, vol. 12, No. 2, pp. 221-229, Feb. 2003.
Boles, "A Security System Based on Human Iris Identification Using Wavelet Transform," IEEE First International Conference on Knowledge-Based Intelligent Electronic Systems, May 21-23, Adelaide, Australia, pp. 533-541, 1997.
Carson et al., "Blobworld: Image Segmentation Using Expectation-Maximization and Its Application to Image Querying," IEEE Transactions on Pattern Analysis and Machine Intelligence, vol. 24, No. 8, pp. 1026-1038, Aug. 2002.
Guo et al., "A System for Automatic Iris Capturing," Mitsubishi Electric Research Laboratories, Inc., 10 pages, 2005.
Guo, "Face, Expression, and Iris Recognition Using Learning-Based Approaches," 132 pages, 2006.
Jalaja et al., "Texture Element Feature Characterizations for CBIR," IEEE, pp. 733-736, 2005.
Kalka et al., "Image Quality Assessment for Iris Biometric," Proc. Of SPIE vol. 6202 62020D, 11 pages, 2006.
Ko et al., "Monitoring and Reporting of Fingerprint Image Quality and Match Accuracy for a Large User Application," IEEE Computer Society, Proceedings of the 33$^{rd}$ Applied Imagery Pattern Recognition Workshop, 6 pages, 2004.
Lau et al., "Finding a Small Number of Regions in an Image Using Low-Level Features," Pattern Recognition 35, pp. 2323-2339, 2002.
Maurer et al., "Tracking and Learning Graphs and Pose on Image Sequences of Faces," IEEE Computer Society Press, International Conference on Automatic Face and Gesture Recognition, pp. 176-181, Oct. 14-16, 1996.
Oppenheim et al, "The Importance of Phase in Signals," Proceedings of the IEEE, vol. 69, No. 5, pp. 529-541, 1981.
Ratha et al., "A Real-Time Matching System for Large Fingerprint Databases," IEEE Transactions on Pattern Analysis, and Machine Intelligence, vol. 18, No. 8, pp. 799-812, Aug. 1996.
Sony, "Network Color Camera, SNC-RZ30N (NTSC)," 6 pages, Aug. 2002.
Wang et al, "Image Quality Assessment: From Error Visibility to Structural Similarity," IEEE Transactions on Image Processing, vol. 13, No. 4, pp. 600-612, Apr. 2004.

Wang et al., "A Universal Image Quality Index," IEEE Signal Processing Letters, vol. 9, No. 3, pp. 81-84, Mar. 2002.

Wang et al., "Local Phase Coherence and the Perception of Blur," Advances in Neural Information Processing Systems 16, pp. 1435-1442, 2004.

Bonney et al., "Iris Pattern Extraction Using Bit Planes and Standard Deviations," IEEE, pp. 582-586, 2004.

Camus et al., "Reliable and Fast Eye Finding in Close-up Images," IEEE, pp. 389-394, 2002.

Cui et al., "A Fast and Robust Iris Localization Method Based on Texture Segmentation," 8 pages, 2004.

Cui et al., "An Appearance-Based Method for Iris Detection," 6 pages, 2004.

Cui et al., "An Iris Detection Method Based on Structure Information," Advances in Biometric Person Authentication, International Workshop on Biometric Recognition Systems, IWBRS 2005, Beijing China, 10 pages, Oct. 22-23, 2005.

Cui et al., "An Iris Image Synthesis Method Based on PCA and Super-Resolution," IEEE Computer Society, Proceedings of the 17th International Conference on Pattern Recognition, 6 pages, Aug. 23-26, 2004.

Cui et al., "An Iris Recognition Algorithm Using Local Extreme Points," Biometric Authentication, First International Conference, ICBA 2004, Hong Kong, China, 10 pages, Jul. 15-17, 2004.

Daugman, "Results From 200 Billion Iris Cross-Comparisons," University of Cambridge Computer Laboratory, Technical Report, No. 635, 8 pages, Jun. 2005.

Du et al., "A One-Dimensional Approach for Iris Identification," 11 pages, prior to Jan. 25, 2006.

http://www.newscientisttech.com/article/dn11110-invention-covert-iris-sc, "Invention: Covert Iris Scanner," 3 pages, printed Feb. 8, 2007.

Huang et al., "Iris Model Based on Local Orientation Description," 5 pages, prior to Jan. 25, 2006.

Huang et al., "An Efficient Iris Recognition System," IEEE Proceedings of the First International Conference on Machine Learning and Cybernetics, Beijing, pp. 450-454, Nov. 4-5, 2002.

Ma et al., "Personal Identification Based on Iris Texture Analysis," IEEE Transactions on Pattern Analysis and Machine Intelligence, vol. 25, No. 12, pp. 1519-1533, Dec. 2003.

Masek, "Recognition of Human Iris Patterns for Biometric Identification," 61 pages, 2003.

Sun et al., "Robust Encoding of Local Ordinal Measures: A General Framework of Iris Recognition," 13 pages, prior to Jan. 25, 2006.

AOptix Technologies, "Introducing the AOptix InSight 2 Meter Iris Recognition System," 6 pages, 2010.

Belhumeur et al., "Eigenfaces Vs. Fisherfaces: Recognition Using Class Specific Linear Projection," 14 pages, prior to Jun. 11, 2010.

Bentley et al., "Multidimensional Binary Search Trees Used for Associative Searching," Communications of the ACM, vol. 18, No. 9, pp. 509-517, Sep. 1975.

Blackman et al., "Chapter 9, Multiple Sensor Tracking: Issues and Methods," Design and Analysis of Modern Tracking Systems, Artech House, pp. 595-659, 1999.

Brasnett et al., "A Robust Visual Identifier Using the Trace Transform," 6 pages, prior to Jun. 11, 2010.

Buades et al., "A Review of Image Denoising Algorithms, with a New One," Multiscale Modeling & Simulation, vol. 4, No. 2, pp. 490-530, 2005.

Chen et al., "Localized Iris Image Quality Using 2-D Wavelets," LNCS vol. 3832, pp. 373-381, 2005.

Chow et al., "Towards a System for Automatic Facial Feature Detection," Pattern Recognition vol. 26, No. 12, pp. 1739-1755, 1993.

U.S. Appl. No. 12/792,498, filed Jun. 2, 2010.

U.S. Appl. No. 12/814,232, filed Jun. 11, 2010.

U.S. Appl. No. 12/814,272, filed Jun. 11, 2010.

Cula et al., "Bidirectional Imaging and Modeling of Skin Texture," Proceedings of Texture 2003, 6 pages, Oct. 17, 2003.

Cula et al., "Bidirectional Imaging and Modeling of Skin Texture," IEEE Transactions on Biomedical Engineering, vol. 51, No. 12, pp. 2148-2159, 2004.

Cula et al., "Compact Representation of Bidirectional Texture Functions," Proceedings of IEEE Computer Society Conference on Computer Vision and Pattern Recognition 2001, 8 pages, 2001.

Cula et al., "Skin Texture Modeling," International Journal of Computer Vision 2004, 34 pages, 2004.

Dabov et al., "Image Denoising by Sparse 3-D Transform-Domain Collaborative Filtering," IEEE Transactions on Image Processing, vol. 16, No. 8, pp. 2080-2095, Aug. 2007.

Dabov et al., "Image Restoration by Spars 3D Transform Collaborative Filtering," SPIE vol. 6812 681207-1, 12 pages, 2008.

Daugman, "High Confidence Visual Recognition of Persons by a Test of Statistical Independence," IEEE Transactions on Pattern Analysis and Machine Intelligence, vol. 15, No. 11, pp. 1148-1161, 1993.

Daugman, "Probing the Uniqueness and Randomness of Iris Codes: Results from 200 Billion Iris Pair Comparisons," Proceedings of the IEEE vol. 94, No. 11, pp. 1928-1935, Nov. 2006.

Fooprateepsiri et al., "A Highly Robust Method for Face Authentication," IEEE 2009 First Asian Conference on Intelligent Information and Database Systems, pp. 380-385, 2009.

Fooprateepsiri et al., "Face Verification Base-On Hausdorff-Shape Context," IEEE 2009 Asia Conference on Informatics in Control, Automation and Robotics, pp. 240-244, 2009.

Forstner et al., "A Metric for Covariance Matrices," 16 pages, prior to Jun. 11, 2010.

Gan et al., "Applications of Wavelet Packets Decomposition in Iris Recognition," LNCS vol. 3832, pp. 443-449, 2005.

Hampapur et al., "Smart Surveillance: Applications, Technologies and Implications," IEEE, 6 pages, Dec. 15-18, 2003.

Hamza et al., "Standoff Iris Recognition Usin Non-Iterative Polar Based Segmentation," Proceedings of SPIE vol. 6944, 8 pages, 2008.

Hanna et al., "A System for Non-Intrusive Human Iris Acquisition and Identification," IAPR Workshop on Machine Vision Applications, pp. 200-203, Nov. 12-14, 1996.

http://en.wikipedia.org/wiki/Radon_transform, "Radon Transform," 5 pages, printed May 14, 2010.

Ivins et al., "A Deformable Model of the Human Iris for Measuring Small Three-Dimensional Eye Movements," Machine Vision and Applications, vol. 11, pp. 42-51, 1998.

Kadyrov et al., "The Trace Transform and Its Applications," IEEE Transactions on Pattern Analysis and Machine Intelligence, vol. 23, No. 8, 66. 811-828, Aug. 2001.

Kadyrov et al., "The Trace Transform as a Tool to Invariant Feature Construction," 3 pages, prior to Jun. 11, 2010.

Kang et al., "Improved Dual Action Contour for Iris Recognition," 10 pages, prior to Jun. 11, 2010.

Li et al., "Appearance Modeling Using a Geometric Transform," IEEE Transactions on Image Processing, 17 pages, 2008.

Li et al., "Appearance Modeling Using a Geometric Transform," Journal Preparation for IEEE Transactions on Image Processing, 30 pages, Nov. 5, 2006.

Ma et al., "Local Intensity Variation Analysis for Iris Recognition," Pattern Recognition, vol. 37, pp. 1287-1298, 2004.

Ma et al., "Video Sequence Querying Using Clustering of Objects' Appearance Models," Advances in Visual Computing Third Annual Symposium, ISVC 2007, 14 pages, 2007.

Monro et al., "DCT-Based Iris Recognition," IEEE Transactions on Pattern Analysis and Machine Intelligence, vol. 29, No. 4, Apr. 2007.

Noh et al., "A Novel Method to Extract Features for Iris Recognition System," AVBPA 2003, LNCS 2688, pp. 862-868, 2003.

Ojala et al., "Multiresolution Gray-Scale and Rotation Invariant Texture Classification with Local Binary Patterns," IEEE Transactions on Pattern Analysis and Machine Intelligence, vol. 24, No. 7, 18 pages, Jul. 2002.

Pamudurthy et al., "Dynamic Approach for Face Recognition Using Digital Image Skin Correlation," Audio and Video Based Person Authentication 5th International Conference, AVBPA 2005, Hilton Rye Town, NY, USA, 11 pages, Jul. 20-22, 2005.

Petrou et al., "The Trace Transform in a Nutshell," 9 pages, prior to Jun. 11, 2010.

Phillies et al., "FRVT 2006 and ICE 2006 Larte-Scale Results," 56 pages, Mar. 2007.

Porikli et al., "Covariance Tracking Using Model Update Based on Means on Riemannian Manifolds," 8 pages, prior to Jun. 11, 2010.

Proenca et al., "Toward Noncooperative Iris Recognition: A Classification Approach Using Multiple Signatures," IEEE Transactions on Patern Analysis and Machine Intellingence, vol. 29, No. 4, pp. 607-612, Apr. 2007.

Ross et al., "Segmenting Non-Ideal Irises Using Geodesic Active Contours," IEEE 2006 Biometrics Symposium, 3 pages, 2006.

Shapiro et al., "pp. 556-559 in Book Entitled Computer Vision," Prentice Hall, prior to Jun. 11, 2010.

Stillman et al., "A System for Tracking and Recognizing Multiple People with Multiple Cameras," 6 pages, Aug. 1998.

Sun et al., "Iris Recognition Based on Non-local Comparisons," Sinobiometrics 2004, LNCS 3338, pp. 67-77, 2004.

Turan et al., "Trace Transform Based Invariant Object Recognition System," 4 pages, prior to Jun. 11, 2010.

Turk et al., "Eigenfaces for Recognition," Journal of Cognitive Neuroscience, vol. 3, No. 1, 16 pages, 1991.

Wang et al., "Recent Developments in Human Motion Analysis," Pattern Recognition, vol. 36, pp. 585-601, 2003.

Wei et al., "Robust and Fast Assessment of Iris Image Quality," LNCS vol. 3832, pp. 464-471, 2005.

Zhao et al., "Dynamic Texture Recognition Using Local Binary Patterns with an Application to Facial Expressions," IEEE Transactions on Pattern Analysis and Machine Intelligence, vol. 29, No. 6, pp. 915-928, Jun. 2007.

Zhi-Hui et al., "Research Iris Serial Images Quality Assessment Method Based on HVS," Proceedings of SPIE, vol. 6034, 6 pages, 2006.

U.S. Appl. No. 13/077,821, filed Mar. 30, 2011.

Freeboy, "Adaptive Optics Speeds Up Airport Immigration," Optics. org/ole, 2 pages, Jan. 2009.

http://www.imagine-eyes.corn/content/view/100/115/, "INOVEO—Ultra-High Resolution Retinal Imaging with Adaptive Optics," 2 pages, printed Feb. 22, 2010.

* cited by examiner

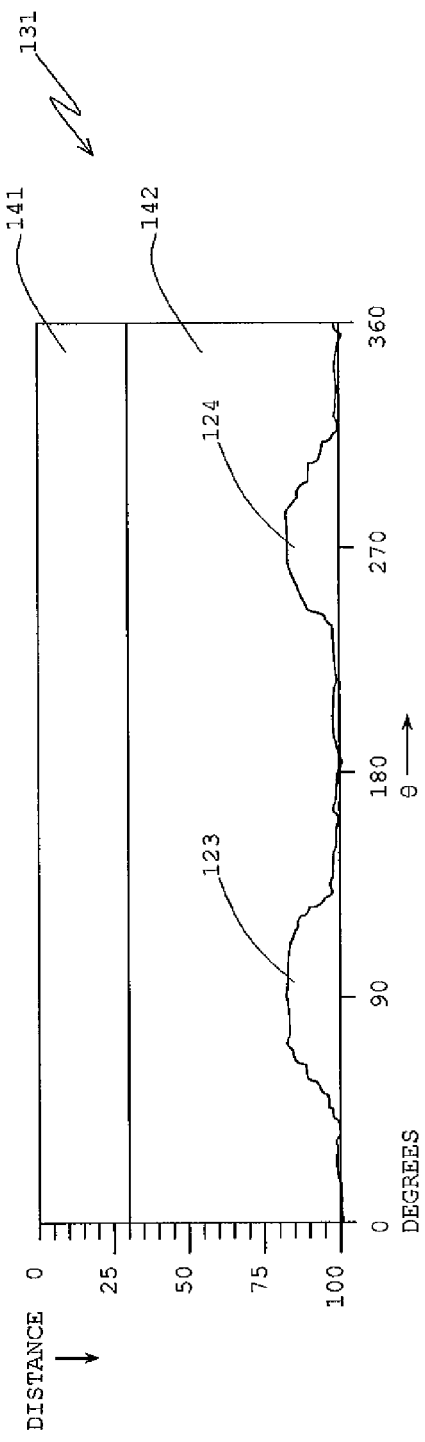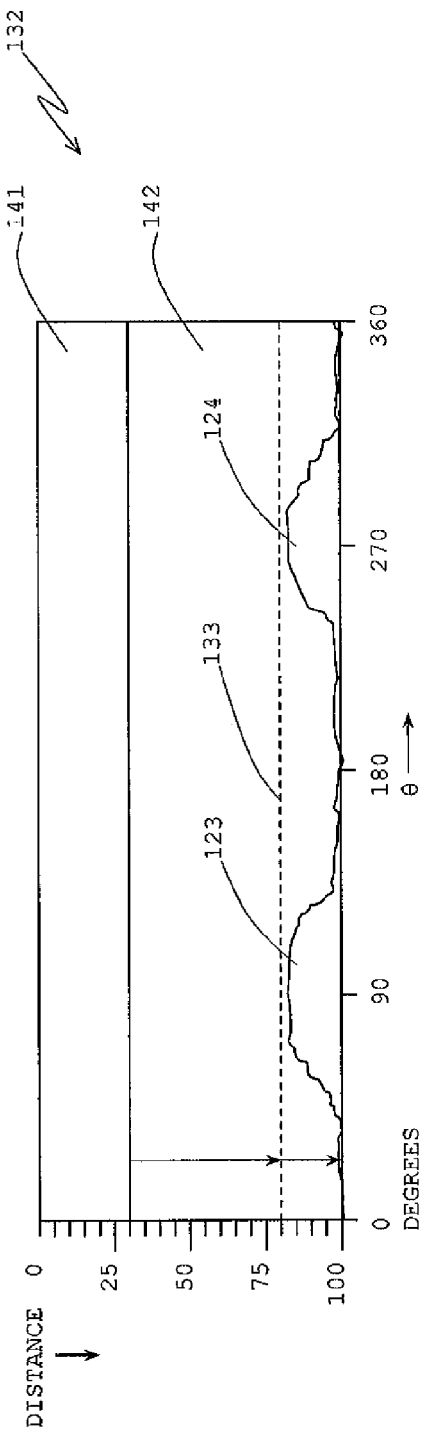

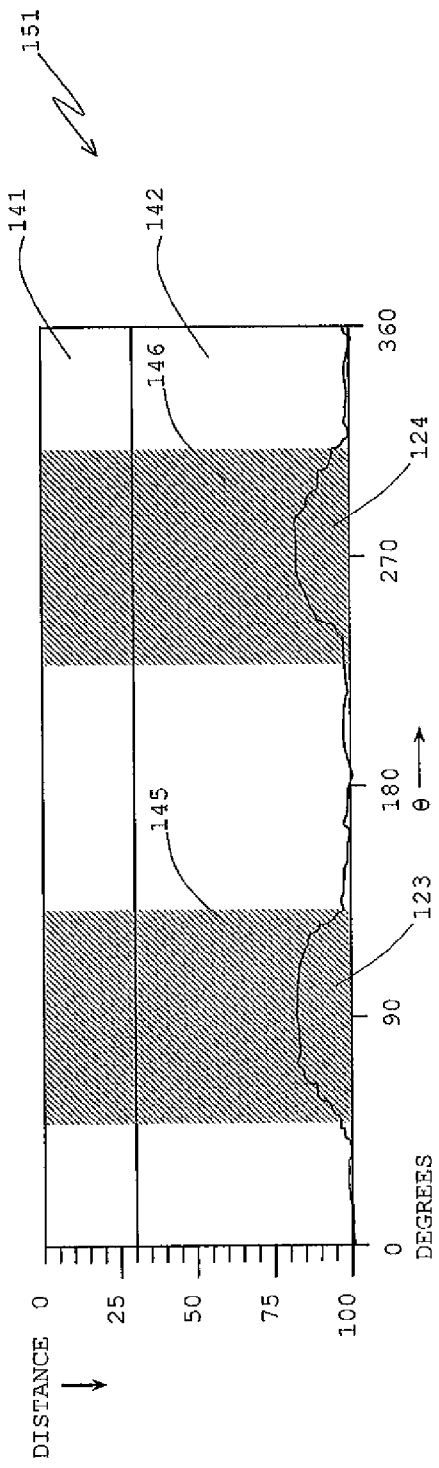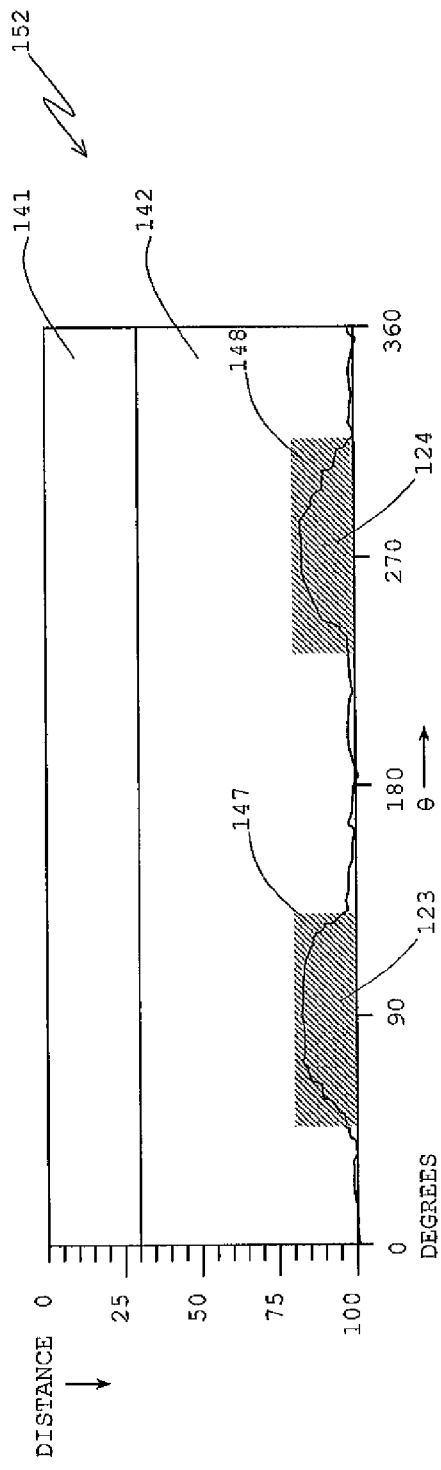

STANDOFF IRIS RECOGNITION SYSTEM

This application is a continuation-in-part of U.S. patent application Ser. No. 11/275,703, filed Jan. 25, 2006, which claims the benefit of U.S. Provisional Application No. 60/647,270, filed Jan. 26, 2005.

This application is a continuation-in-part of U.S. patent application Ser. No. 11/043,366, filed Jan. 26, 2005.

This application is a continuation-in-part of U.S. patent application Ser. No. 11/372,854, filed Mar. 10, 2006;

This application is a continuation-in-part of U.S. patent application Ser. No. 11/672,108, filed Feb. 7, 2007.

This application claims the benefit of U.S. Provisional Application No. 60/778,770, filed Mar. 3, 2006.

The government may have rights in the present invention.

BACKGROUND

The present invention pertains to recognition systems and particularly to biometric recognition systems. More particularly, the invention pertains to iris recognition systems.

Related applications may include U.S. patent application Ser. No. 10/979,129, filed Nov. 3, 2004, which is a continuation-in-part of U.S. patent application Ser. No. 10/655,124, filed Sep. 5, 2003; and U.S. patent application Ser. No. 11/672,108, filed Feb. 7, 2007.

U.S. patent application Ser. No. 11/275,703, filed Jan. 25, 2006, is hereby incorporated by reference.

U.S. Provisional Application No. 60/647,270, filed Jan. 26, 2005, is hereby incorporated by reference.

U.S. patent application Ser. No. 11/043,366, filed Jan. 26, 2005, is hereby incorporated by reference.

U.S. patent application Ser. No. 11/372,854, filed Mar. 10, 2006, is hereby incorporated by reference.

U.S. Provisional Application No. 60/778,770, filed Mar. 3, 2006, is hereby incorporated by reference.

U.S. patent application Ser. No. 11/672,108, filed Feb. 7, 2007, is hereby incorporated by reference.

SUMMARY

The present invention is a stand off iris recognition system.

BRIEF DESCRIPTION OF THE DRAWING

FIGS. 13-18 are diagrams of various kinds of masking for noisy and informational areas of the eye.

DESCRIPTION

Figure 1:
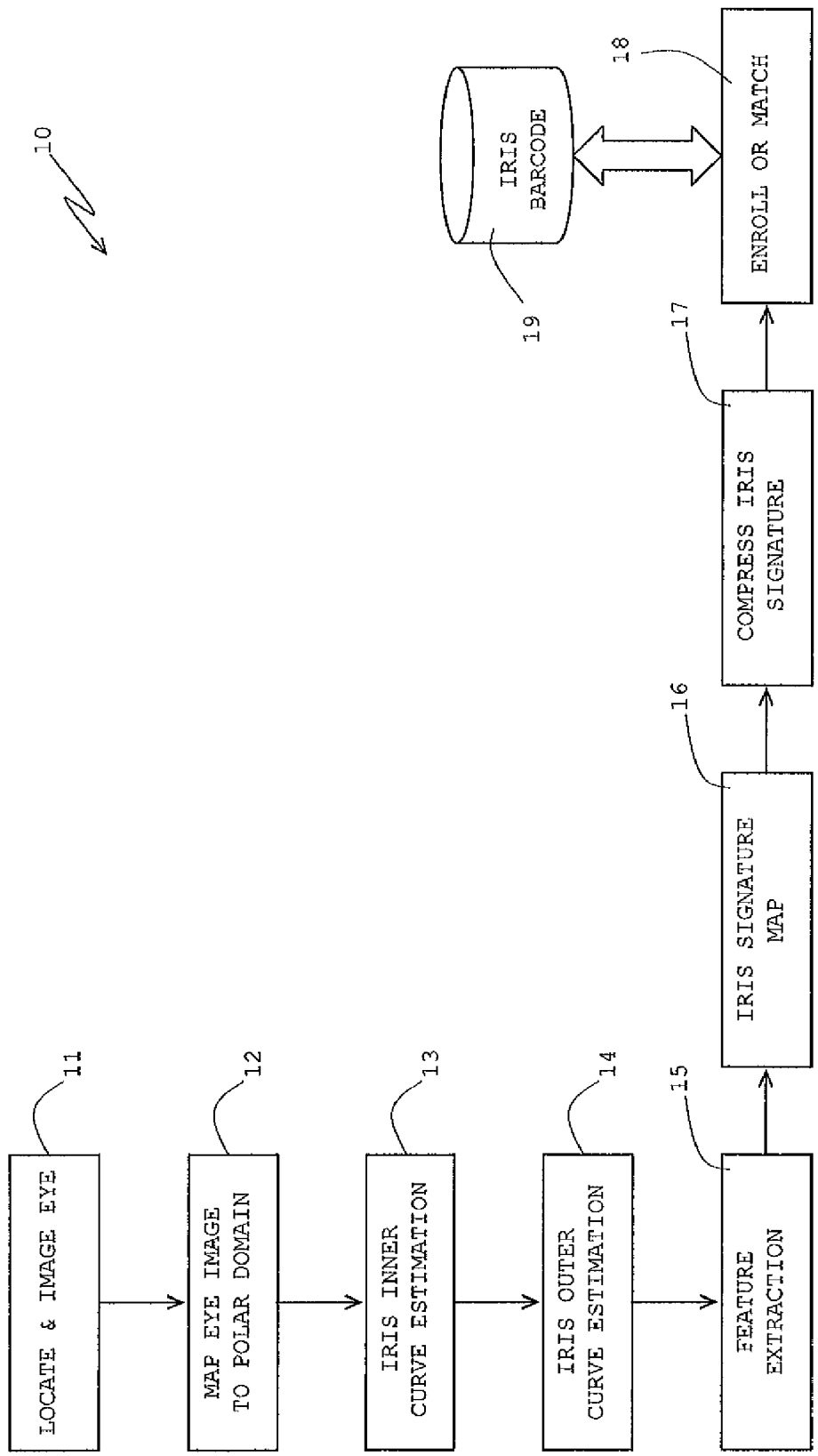
FIG. 1 is a diagram of an overall structure of the standoff iris recognition system.

Various noted properties of irises may make iris recognition technology as a reliable person identification tool. For instance, irises may have uniqueness unlike other biometric technologies, such as face-prints and fingerprints. Irises may be unique to a person and even among genetically twin individuals. Although the striking visual similarity of identical twins reveals the genetic penetrance of facial appearance, a comparison of genetically identical irises reveals just the opposite for iris patterns. Further, there appears to be no aging effect, that is, there is stability over the life of iris features. The physical characteristics of iris patterns are unalterable without significant duress. A non-invasive iris may be considered as an internal unique organ but yet is externally visible and can be measured. It is in a protected environment but still visible.

The present system and approach address the real-time operational requirements of a standoff iris recognition system and may be regarded as an "on-the-fly" iris recognition system. Unlike other approaches, which mostly are based on brute force of a Hough Transform to fit the iris edges into circular or regular shapes, one may employ an efficient and robust enhancement approach built around a polar segmentation (POSE) technique by the present assignee disclosed in U.S. patent application Ser. No. 11/043,366, filed Jan. 26, 2005. Present improvements made to the POSE segmentation technique contribute to a robust and computational efficient and accurate real-time iris recognition.

The present iris recognition system is well suited for high-security access control or "at-a-distance biometrics" applications with little or no control exercised on subject positioning or orientations. The iris recognition operation may include subjects captured at various ranges from the acquisition device or include subjects that may not have their eye directly aligned with the imaging equipment. Usually, for such applications, it may be difficult to implement a level of control required by most of the existing art to enable reliable iris recognition operations. The present approach of iris recognition may cope with asymmetry in acquired iris imaging and it can operate under any uncontrolled operations as long as some of the iris annular is visible.

The present system may provide an accurate segmentation technique and hence identify good iris patterns, which may be regarded as signatures. The present system may take the analysis of edges into polar domain and use local patterns to detect iris features using an enhanced version of POSE technique disclosed in U.S. patent application Ser. No. 11/275, 703. This technique may detect curves of the iris borders of any irregular shapes. A detection algorithm may robustly detect the inner and outer borders of the eye iris for the purpose of human or animal recognition.

The present approach may begin with a mapping the analysis immediately into the polar domain with respect to a centered point in the pupil region. The centered point, not necessarily the exact center of the pupil but may be identified within the pupil region. One may then detect edges of the inner and outer borders of the iris based upon a one dimensional polar segmentation (1D POSE) technique and detect the irregular shape of the iris curves using additional rules that are introduced on the POSE technique to cluster the edge points separately into two groups that represent edges at the sclera and edges at the borders of the eyelids. One may extract the iris signature using a guided analysis to correctly normalize the stretching and compression of the patterns and bring uniformity into the interpretation of the patterns. In addition, one may cluster obscured pixels and affected areas to be either weighted with low weights or masked out of the analysis. The patterns may then be matched against multiple codes within a database and are given weights based upon the pattern visibility and exposure to the camera system.

The present system and approach may include the following items. There may be a map analysis at an earlier stage to conduct segmentation into the polar domain. Iris inner border detection may be achieved using the estimated edges of POSE or any other active contour technique that provides a way to analyze each edge at each angle separately to determine whether the resulting edge is a valid border edge or invalided edge. A valid edge may be defined as an edge that was detected within a predefined range. Any edge point that results out of range or at the extreme points of the gradient signal segment may represent a leaked peak and is treated as invalid edge. A predefined regular or irregular model shape may be used to fit the resulting edges. The depicted model shape may be used to fill in any missing edges within the contour of the pupil to replace the non-valid points with the estimated points from the irregular shape. The analysis may be offset with a predefined minimum possible width of an iris as the starting point for the iris outer border analysis. Boundary edges may be extracted using POSE. A median filter may be run to smooth the resulting outcome of POSE. The boundary edge points may be clustered into several categories: 1) sclera and iris boundary points; and 2) iris and eyelid boundary points to be analyzed differently. The valid sclera and iris boundary points may be extracted. These edge points may be fitted into a predefined regular model shape. The regular model shape may be used for guidance of the analysis and will not present the final outcome of the edge estimates.

One may track the lowermost points of the lowermost curve of the upper eyelid edge, and track the uppermost points of the upper curve of the lower eyelid edges. Then one may interpolate among these samples to replace the entire angular range corresponding to the eyelid obscurations. The area between the estimated eyelid-eyelash curve and the pupil curve (inner border) may be measured. Weights may be assigned based upon significance of the area between the curves. In some approaches, one may choose to assign zero to the weights to discard the entire region given the significance of the occlusions. The spacing between the inner and outer curves may be scaled based upon the position of the outer curve within the regular shape. The actual edge points detected by POSE may be used to be the actual edges of the iris borders and not the fitted model shapes.

Any pixel that lies within the outer border of the iris and the fitting model shape may be masked. Any pixel that lies outside the fitting shape may be discarded. The pixels may be mapped into an iris pattern map. Virtually any encoding scheme may be used to compress the image into few bits while covering the entire angular range using a predefined angular resolution and radius resolution. A similarity of information metric may be used to measure the similarity among the barcode of the templates for matching while weighing the pixels that come from valid edges with higher values and weighing pixels associated with invalid edges or obscuration with smaller or zero values.

The present approach may be for performing iris recognition under suboptimal image acquisition conditions. The approach may be for iris segmentation to detect all boundaries (inner, outer, eyelid and sclera and horizon) of the image iris simultaneously.

The overall structure of the standoff iris recognition system 10 is shown in the FIG. 1. One may start an analysis by mapping 12 a located eye image 11 into a polar domain at the start with respect to a centered point within the pupil region of the eye image. An approach to estimate a point within the pupil may be straightforward in that it can use thresholding or summation over the x-axis and the y-axis to localize the darkest contrast within the eye image to locate the pupil region. The eye finder approach which is discussed in U.S. patent application Ser. No. 11/672,108, filed Feb. 7, 2007, may be used to estimate a pupil point. There may be an iris inner curve estimation 13 and outer curve estimation 14. A feature extraction 15 may proceed, leading to an iris signature map 16. The iris signature 17 may be compressed. An enroll and/or match 18 may occur with iris signature data flowing to and from a storage 19 in the form of bar codes.

Figure 2:
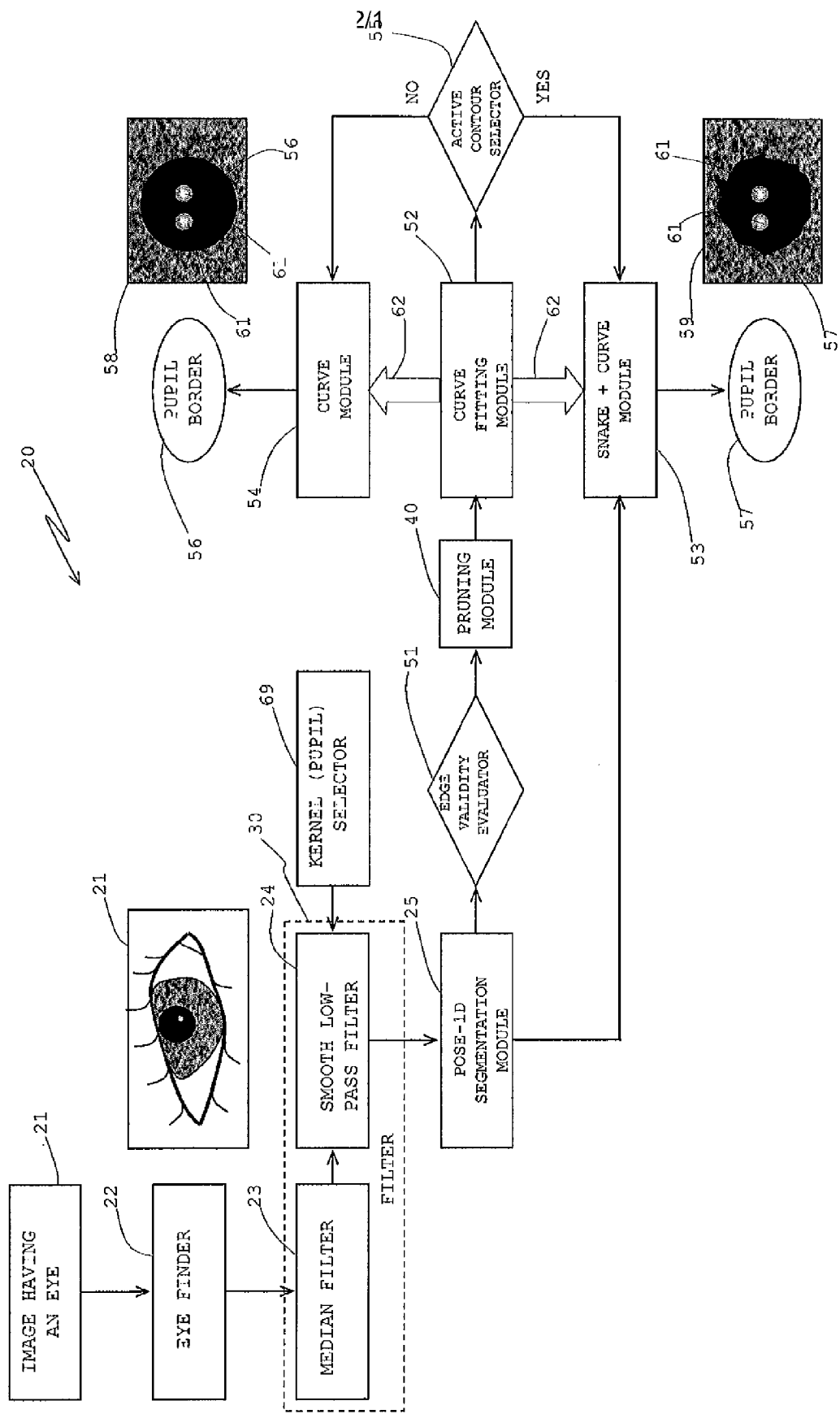
FIG. 2 is a diagram of a pupil processing mechanism.

FIG. 2 is a diagram of a pupil processing mechanism 20. An image 21 having an eye may go to an eye finder 22 which is discussed in U.S. patent application Ser. No. 11/672,108, filed Feb. 7, 2007. From the eye finder, the result may enter a filter 30 having a median filter 23 and then a smooth low pass filter 24 for noise removal. One does not want an actual feature on the pupil to interfere with the actual edge detection. An input kernel (pupil) module 69 may define a specific kernel or matrix of pixels covering just the pupil from the eye image for analysis. The edges of the pupil may include the most significant peaks, sufficient for detection. An output image of the pupil with certain edge smoothened out may go from the filter 24 may go to a POSE-ID segmentation 25.

Constraint evaluation is where a peak may be detected within a range. Edge detection may be on the limits within a certain range. A rough center location and an approximate size of the pupil may be attained. When the edges of the pupil are detected as peaks within the 1D signal along the radial axis and are said to be valid if they were detected within the radial range, one may have a validation of the pupil by testing the pupil profile, estimates of the edges. The new edges may yield to a better estimate of the pupil center sufficient for analysis.

A median filter 23 may be applied to eliminate salt and pepper noise due to the system acquisition of background noise. At this point, the image may be a kernel, i.e., a block of pixels of a pupil for analysis. The image 21 may be passed through a low pass filter 24 to smooth the variation with the pupil region while preserving the apparent contrast change at the edge of the pupil and the iris. Next, the POSE-1D segmentation 25 may be applied. The validity of the edges at step or stage 51, indicated by a diamond symbol, may be determined by checking whether the peaks in the contrast changes are leaked to the edges of the gradient of the contrast change signal. The leaking may indicate several cases. A constraint may include that the pixels of the edge be within a set range. First, the actual edge of the pupil may be too close to the signal edge and therefore the detected edge might not reflect the actual edge of the gradient. There may not be enough contrast to can determine whether there is a pupil edge. There may be a presence of obstacles that is obscuring the pupil edges. Obstacles may include skin of an eye, eyelashes due to eye closure, an eyeglass frame, a contact lens, optics, and the like. In either case, the peak may be deemed an invalid peak or an edge of a pupil. One may then fit only the valid points into a predefined model shape, i.e., elliptic fitting 52, just for guidance. Two alternatives may then be proposed. In an approach 54, one may actually use the estimated shape 56, 52, 48 (i.e., ellipse) that replaces the actual edges as an approximation to the pupil edges (which may also be referred to as an inner bound of the iris). In another approach 53, the actual active contour edge 57 may be kept as a final outcome using the POSE technique and only the invalid edges will be replaced by points from the estimated shape (i.e., the estimated ellipse).

Figure 9:
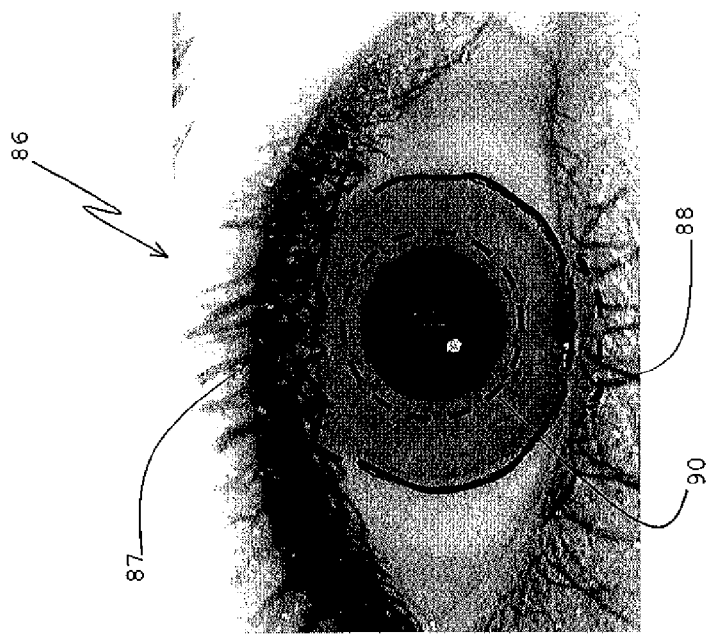
FIG. 9 is an illustration showing an eye having eyelash/lid obscuration.

Once the iris inner border at the pupil is estimated, one may move outward from the pupil with some margin that represents the least possible width of an iris. Then that width offset may be used as the starting point of the iris outer border analysis. An offset 90 of FIG. 9 may vary from zero to some value depending on the visibility of the pupil within the eye image during image acquisition. For instance, one offset may vary dependent on a scoring and/or a validation of a pupil profile being captured. Relative to a closed or highly obscured eye, an offset may be at a minimum or zero. For an open eye with no obscuration and having a high score and/or validation of a pupil profile, the offset may be large. The offset may vary depending on the areas or angular segments of the eye that are visible. Offset may vary according to the border type. For example, the iris/sclera border may warrant significant offset, and the offset for the iris/eyelash-lid may be low, minimus or zero. The iris outer border analysis is illustrated, at least partially, in a diagram of FIG. 3.

Figure 3:
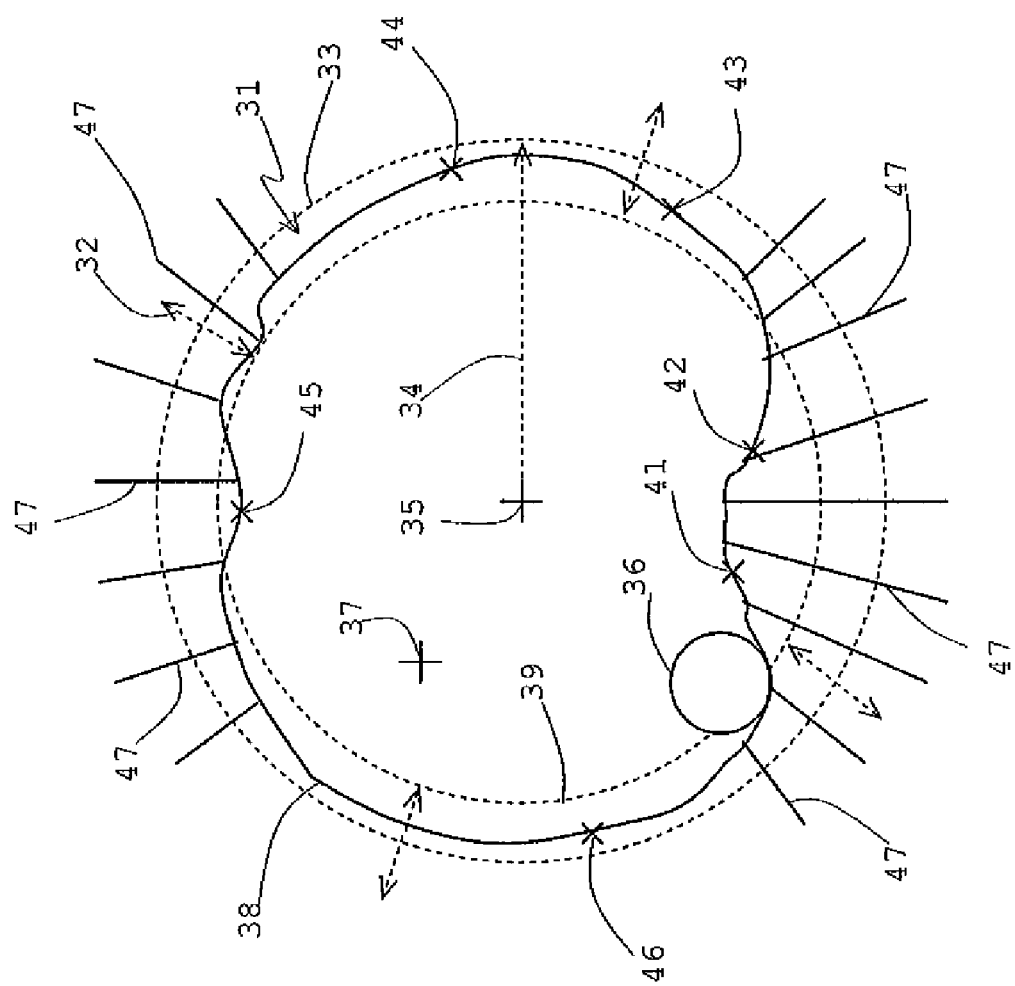
FIGS. 3, 4 and 5 are diagrams showing a basis for pupil border analysis, curve fitting and portion substitution.

FIG. 3 shows a pupil 31 of which a portion of an edge 38 is within a range 32 of a circle 33 having a radius 34 about an approximate center 35. It may be noted that there may be a first reflection 36 and a first center estimate 37. However, an approximate center 35 is noted for subsequent use. The range 32 can have a set amount of deviation that the edge 38 of pupil 31 may have and yet be regarded as valid. It may be noted that the edge 38 could but does not extend beyond the outer circumference of range 33, but edge 38 does appear at points 41, 42 and 45 to be inside of a circumference 39 showing an inner limit of range 32. Points 43, 44 and 46 appear within the range 32 and thus may be deemed to be valid. The edge 38 of the pupil 31 may not be within the range 32 at points 41, 42 and 45 because of the eyelashes, eyelid and/or noise 47 at the bottom and top of the pupil. Other factors of pupil 31 may include a blob fitting (BF) and a coverage fitting (CF). An example set of percentages may be BF=78% and CF=92%, which appear to be an acceptable indication of an actual pupil. The validity of the edge 38 may be determined at symbol 51 of FIG. 2. The input may be an output from the segmentation stage or block 25. Also, an output from block 25 may go to a snake plus elliptic curve (or the like module) block 53.

Figure 4:
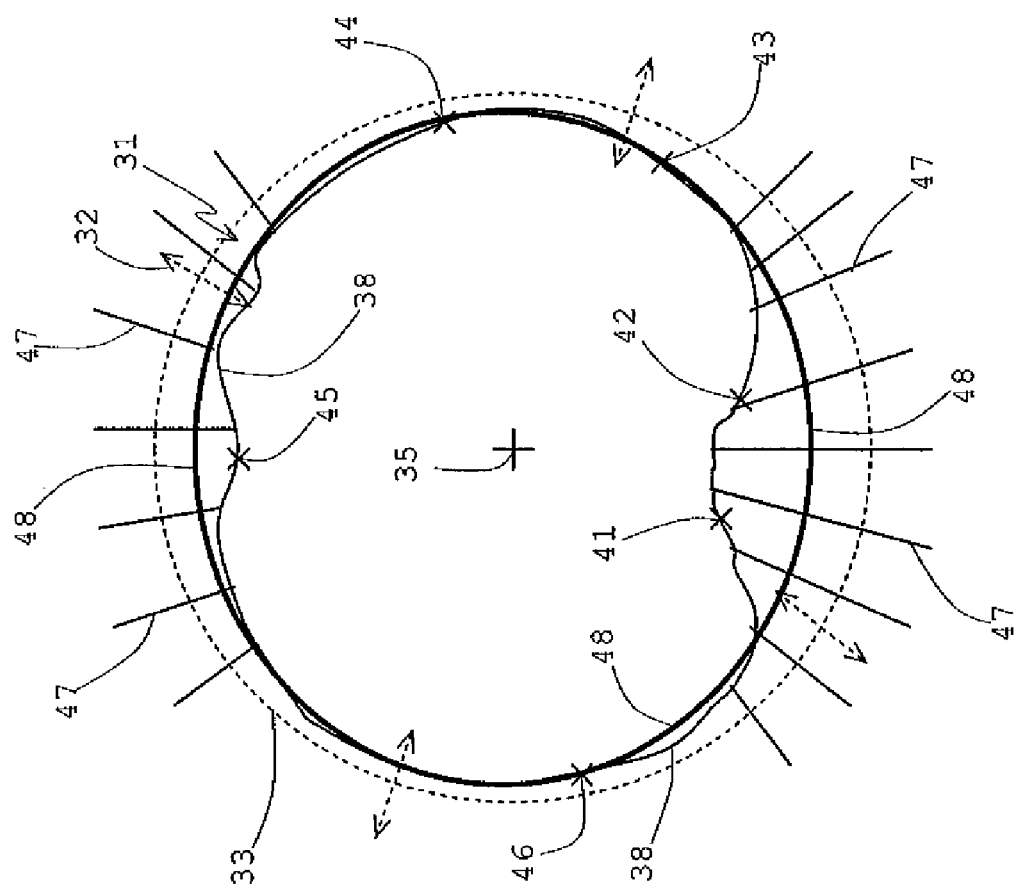
Figure 5:
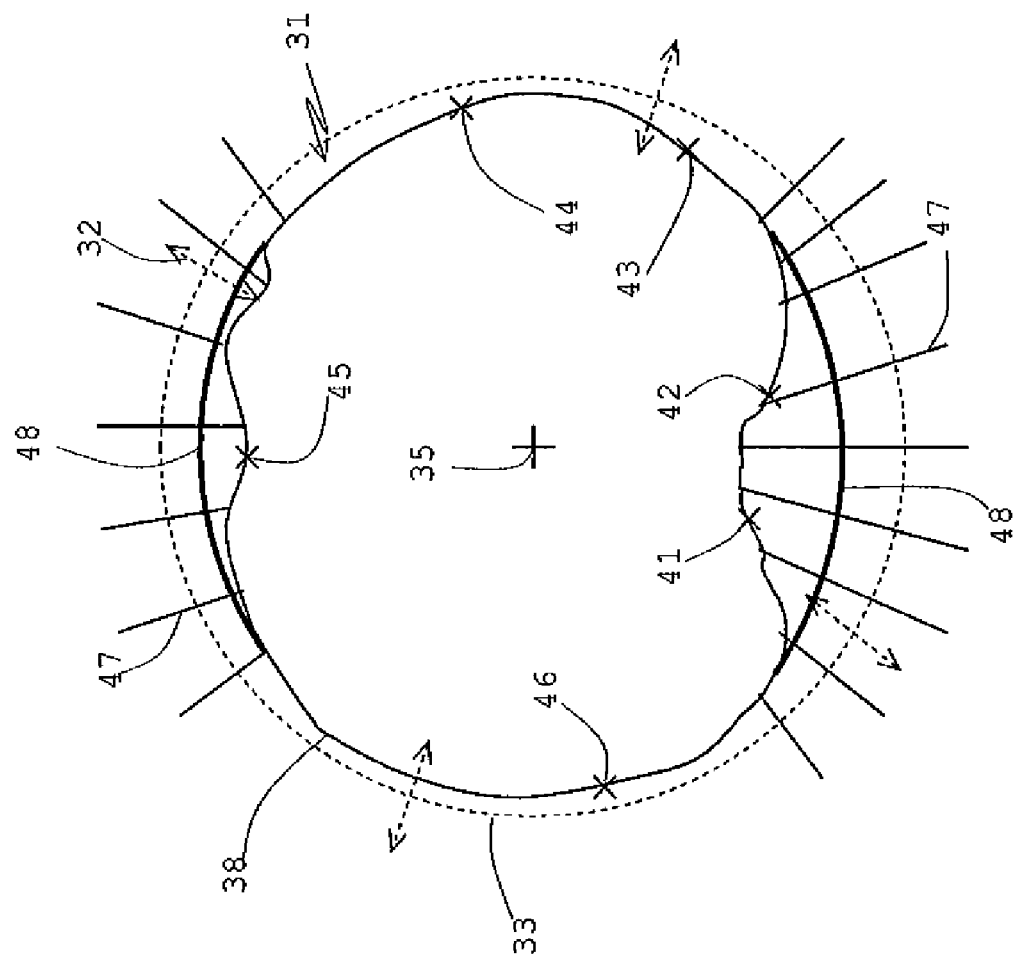

The output of the valid edge determination diamond symbol 51 may go to a pruning block 40 where prompt changes of the edge 38 may be smoothed or reduced in its extension out from the edge curve. Then, the edge 38 may go to a predefined model shape (such as elliptic fitting) block 52. Here, the edge 38 of pupil 31 is fitted with a model shape curve 48 (as an example, one may show an elliptic shape as a fitting model shown as a thick line in FIG. 4). The entire edge 38, including the invalid and valid portions, may be replaced with the elliptic fitting 48 in a first approach (elliptic or like module) 54. Only the valid portions of the edge 38 are incorporated in determining an elliptic fitting curve 48 as indicated by block 54. The elliptic fitting 48 may used to do a final estimate of the pupil center 35. In a second approach, a non-linear fitting may be done as shown in FIG. 5. The model fitting 48 may be kept for only the non-valid portion or points 41, 42 and 45, but the actual valid edges or points 43, 44 and 46 may be kept, as indicated by block 53.

An output of elliptic fitting block 52 may go to a diamond 55 which asks whether the actual contour 38 or the model fitting 48 should be used. One may note that in either case, the model fitting or curve 48 should always be used for the non-valid portions of curve or contour 38 incorporating such. The approach does not get affected by any reflection within the pupil and as shown in FIG. 3, the analysis goes around the reflection and thus it would be neglected without having to add any preprocessing for its elimination. Besides reflections, a partially closed eye, eyelashes or lids, noise, and the like may be well treated using this segmentation method.

If the answer at diamond 55 is no, then the model curve 48 is used in place of the valid and non-valid portions of pupil edge 38. The output of block 54 may be a pupil border 56 as shown in image 58. If the answer is yes at diamond 55, then a "snake", which is an active contour, that is, an estimate of the actual edge 38, rather than the ellipse approximation 48, is used for the valid portions of edge 38. The output of block 53 may be a pupil border 57 as shown in image 59. One may note two reflections 61 in the pupil of images 58 and 59. These reflections may be a pattern of the light used for analytical purposes of a pupil and so that the reflection on the pupil may be found and identified. Also, arrows 62 may repeat elliptic fitting data sent to blocks 53 and 54 for effecting an elliptic curve fit.

An enhancement to elliptic fitting may be added as a part of the elliptic fitting box 52. This enhancement may be a pruning of the pupil edge before doing a model fitting at block or module 52 (FIG. 2). The pruning may be used to smooth the curve edges and eliminate any mismatches of extraneous edges. In pruning, outliers are replaced with the likelihood edge within a predefined angular segment.

Figure 6:
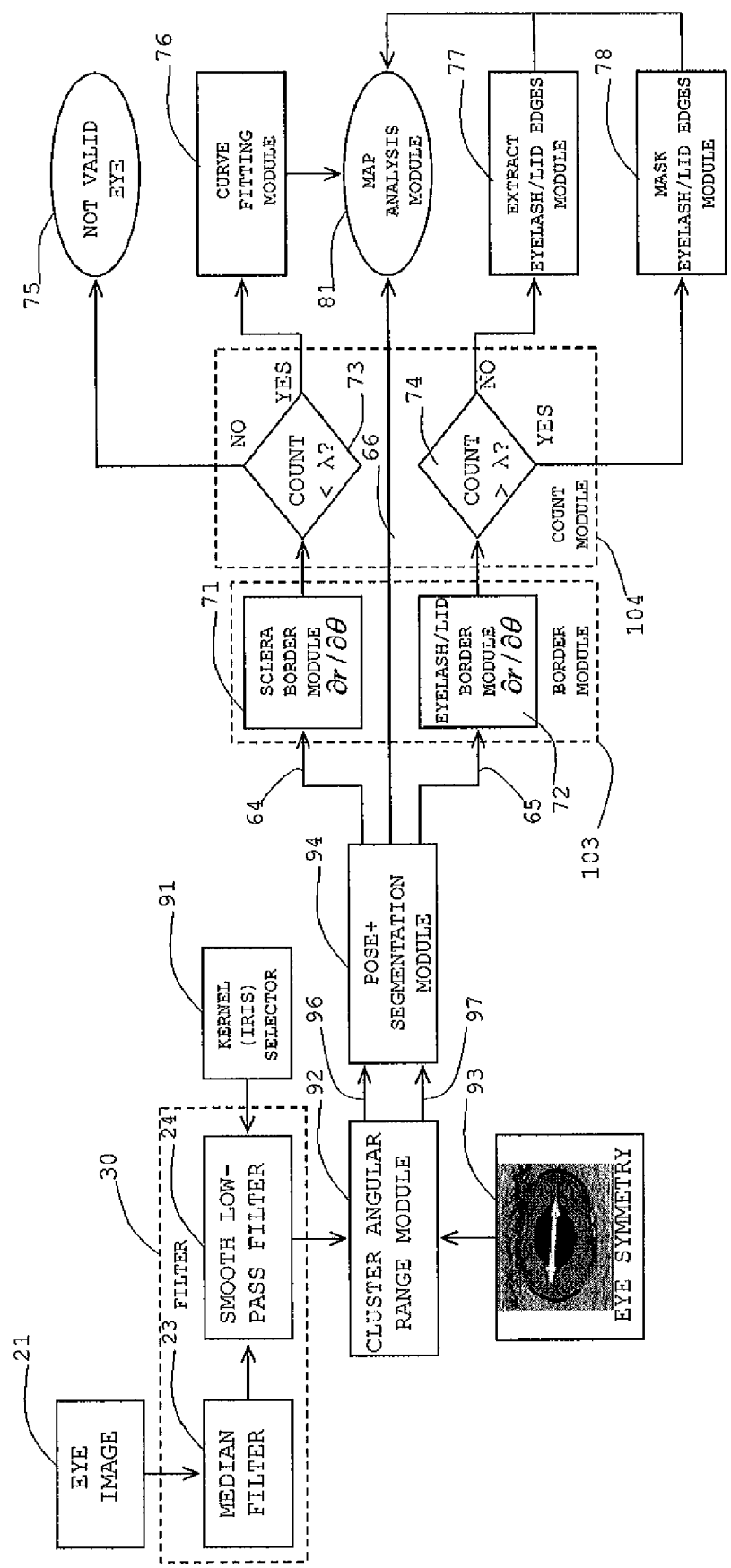
FIG. 6 is a diagram of an approach for an iris outer border analysis, curve fitting and portion removal or substitution.

FIG. 6 is a diagram of an approach for an iris outer border analysis, curve fitting and portion removal or substitution. An eye image 21 may be processed through the median filter 24, respectively, which is noted herein. A kernel 91, which may be a matrix or block of pixels of the iris of the image 21, can be processed. A resulting image 93 for analysis may proceed to a cluster angular range module 92. The eye symmetry, as shown by inset 93, may proceed on to a POSE+ (illustrated in FIG. 7) segmentation module 94.

Figure 7:
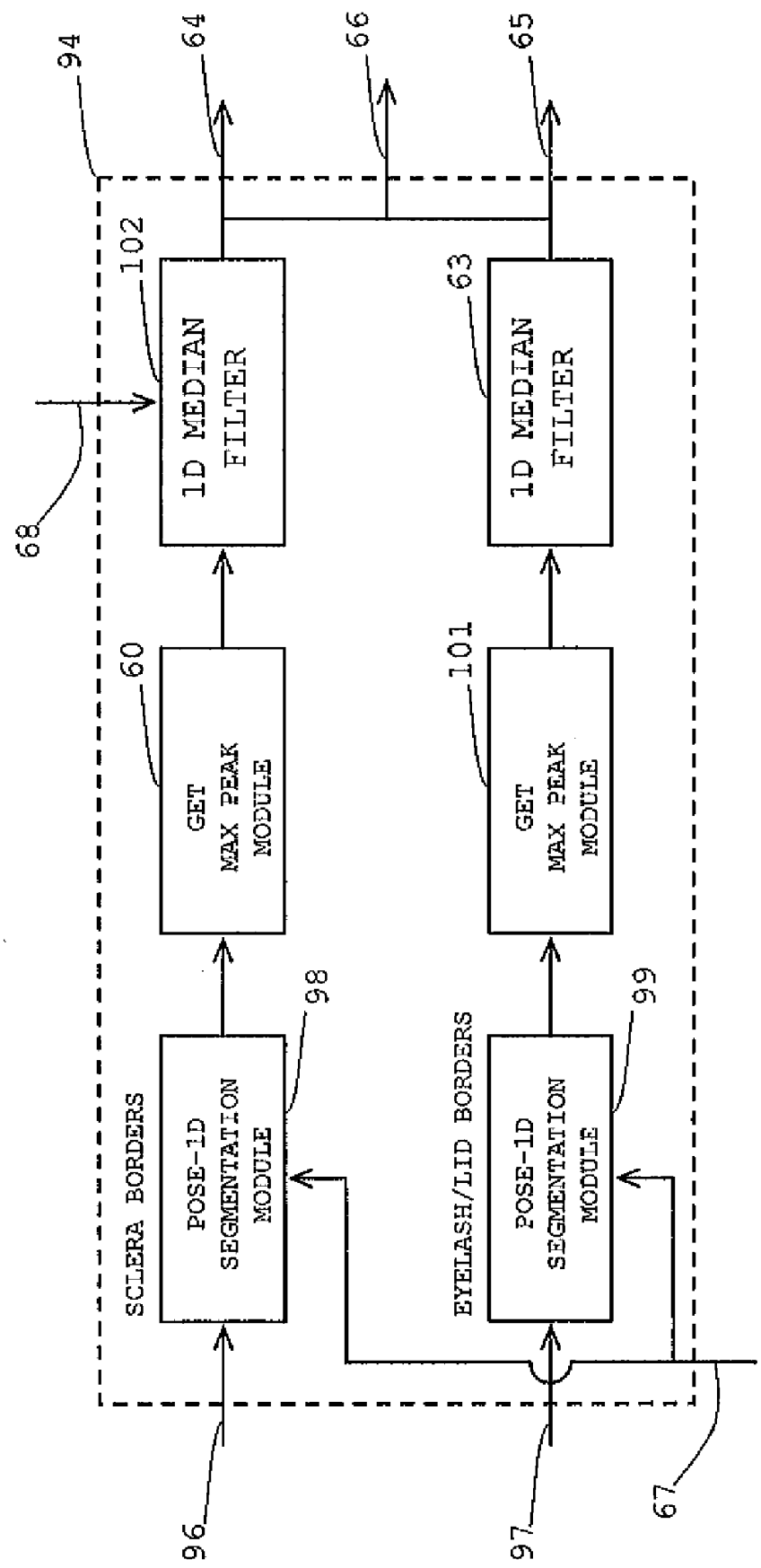
FIG. 7 is a diagram of a polar segmentation subroutine mechanism.

FIG. 7 reveals more detail (i.e., the 1D POSE+ subroutine) of the segmentation module 94. Two major portions of the eye image 93 go to module 94 for segmentation concerning sclera borders and eyelash borders. Input 96 for sclera borders may go to a 1D POSE segmentation submodule 98 and input 97 for eyelash borders may go to 1D POSE segmentation submodule 99. Information 67 of the pupil model fitting, center may be input to the submodules 98 and 99. An output of segmentation submodule 98 may go to a get max peak submodule 60 which in turn provides an output to a 1D median filter 102. Also input to median filter 102 may be a filter bandwidth 68. An output from segmentation submodule 99 may go to a get max peak submodule 101 which in turn provides an output to a 1D median filter 63. A filter bandwidth signal 68 may be provided to filter 63.

An output 64 from median filter 102 of module 94 may go to a $(\partial r/\partial \theta)$ module 71 for sclera borders, as shown in FIG. 6. An output 65 from median filter 63 may go to a $(\partial/\partial \theta)$ module 72 for eyelash/lid borders. Modules 71 and 72 may be of a border module 103. An output from module 71 may go to a count module 73, and an output from module 72 may go to a count module 74. Modules 73 and 74 may be of a count module 104. If the count at module 73 is not less than $\lambda$, where $\lambda$ is threshold, then there is not a valid eye image 75. If the count is less than $\lambda$, then a circular, elliptic, or the like, fitting may be placed on the iris outer sclera borders at module 76. If the count at module 74 is not greater than $\lambda$, then the eyelash edges may be extracted at module 77. This may involve 1D POSE+. If the count at module 74 is greater than $\lambda$, then the eyelashes may be masked at module 78. This may involve POSE 1D. $\lambda$ may be a number indicating a number of hits or places where a curve discontinues. The range of $\lambda$ may be around 3 or 4. Under certain circumstances of more tolerance, $\lambda$ may be set to be 5 or greater.

A combined output 66 from the 1D median filters 102 and 63 may go to a map analysis center 81. Also, outputs from the circular fitting module 76, the extract eyelash edges module 77 and the mask eyelashes module 78 may go to a center 81 for a map analysis.

The preprocessing may include the filter or combination 30 of a median 23 and low pass filter 24 of FIG. 6 to smooth the iris texture while preserving the strong edge of the contrast change at the outer border of the iris. One may then cluster the angular range into two categories. Boundary points may be clustered. With the occlusion of the iris by the eyelids and eyelids, there may be two groups of boundary points around the outer bounds of the iris that may be treated differently in the present analysis. The groups may be iris sclera boundaries and iris eyelid boundaries. The two classes of points may be treated according to the expected distributions of edge pixels. To cluster the points into these two classes, one may use the symmetry method in POSE+ (see U.S. patent application Ser. No. 11/275,703, filed Jan. 25, 2006) where pixels placed symmetrically relative to each other in terms of curvature with smooth continuous edges.

In another approach, one may estimate the limits the symmetry ends by conducting the following steps. The lowermost edge points of the upper eyelid edge may be fit into a straight-line and the uppermost of the lower eyelid edge points may be fit into a straight line crossing the detected iris outer border curve (original curve detected by POSE). The intersection of these two straight lines and the curve may define a good estimate of the trapezoid contour of the eye socket. The intersection of these lines and the pre-estimated shape may define these boundary points. The POSE+ subroutine is shown with a diagram in FIG. 7.

FIG. 7 reveals more detail (i.e., the 1D POSE+ subroutine) of the segmentation module 94. Two major portions of the eye image 93 go to module 94 for segmentation concerning sclera borders and eyelash borders. Input 96 for sclera borders may go to a 1D POSE segmentation submodule 98 and input 97 for eyelash borders may go to 1D POSE segmentation submodule 99. Information 67 of the pupil ellipse fitting and center may be input to the submodules 98 and 99. An output of segmentation submodule 98 may go to a get max peak submodule 60 which in turn provides an output to a 1D median filter 102. Also input to median filter 102 may be a filter bandwidth 68. An output from segmentation submodule 99 may go to a get max peak submodule 101 which in turn provides an output to a 1D median filter 63. A filter bandwidth signal 68 may be provided to filter 63.

An output 64 from median filter 102 of module 94 may go to a ($\partial r/\partial \theta$) module 71 for sclera borders. An output 65 from median filter 63 may go to a ($\partial /\partial \theta$) module 72. An output from module 71 may go to a count module 73, and an output from module 72 may go to a count module 74. If the count at module 73 is not less than λ (where λ is as discussed herein), then there is not a valid eye image 75. If the count is less than λ, then a circular fitting may be placed on the iris outer sclera borders at module 76. If the count at module 74 is not greater than λ, then the eyelash edges may be extracted at module 77. This may involve 1D POSE+. If the count at module 74 is greater than λ, then the eyelashes may be masked at module 78. This may involve POSE 1D. A combined output 66 from the 1D median filters 102 and 63 may go to a map analysis center 81. Also, outputs from the circular fitting module 76, the extract eyelash edges module 77 and the mask eyelashes module 78 may go to a center 81 for a map analysis.

Figure 8A:
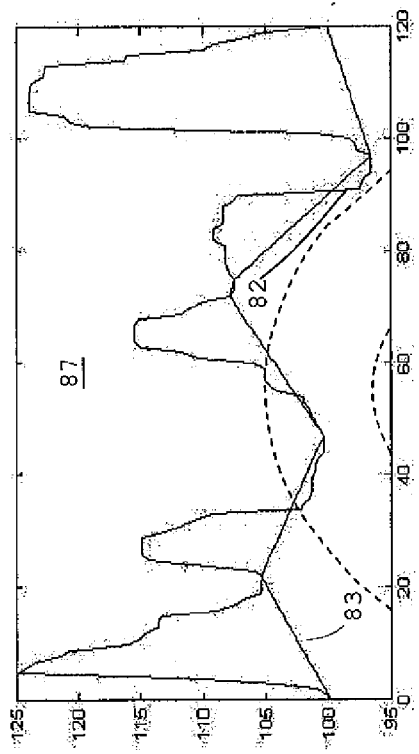
FIGS. 8a and 8b are diagrams illustrating an approach for estimating eyelash/lid curve detection.
Figure 8B:
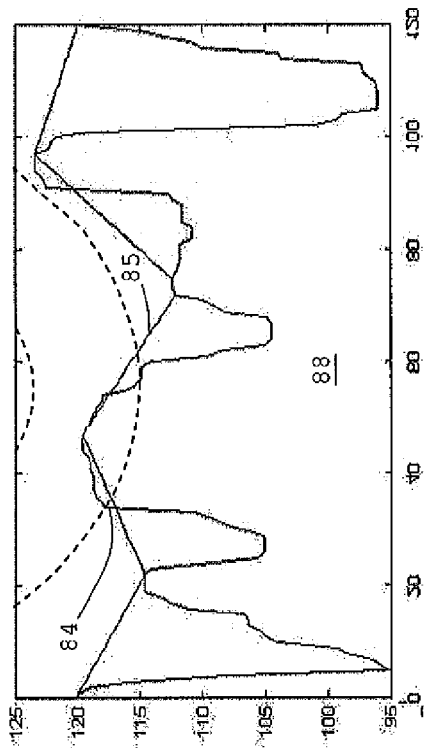

Eyelid detection may be noted. With the nature of eye closure under nominal conditions, there may be two possibilities for eye positioning. One is a wide-open eye and another partially open. In either case, one might only consider points of observable edges of iris in the curve fitting. To estimate the eyelid edges, one may track the lowermost points of the lowermost curve 82 (FIGS. 8a and 8b) of the upper eyelid 87 edge, and track the uppermost points of the upper curve 84 of the lower eyelid 88 edges. FIGS. 8a and 8b are graphs illustrating an approach for estimating eyelid curve detection. A piece-wise linear fitting 83 of the local minima of the curve 82 may be done for the upper eyelid 87. A piecewise linear fitting 85 of the local maxima of the curve 84 may be done for the lower eyelid 88.

One may interpolate among these samples to cover the entire angular range corresponding to the eyelid segments, $L=]\theta_2-\theta_1[$. Thus, $$\forall (x_k, x_{k-1}) \text{ pair sequence;} \quad (1)$$
$$\text{Let } \Delta x = (x_k, x_{k-1});$$
$$\Delta f = \frac{f(x_k) - f(x_{k-1})}{\Delta x}$$
$$\Rightarrow \forall x_{k-1} < x < x_k, \ f(x) = f(x_{k-1}) + \Delta x \Delta f$$

One may limit the sampling space to a predefined angular range $\phi$, so the next sampling point is determined using the following minimization equation, $\tilde{x}_k=\min(x_{k-1}+\phi,x_k)$. FIGS. 8a and 8b illustrate a technical approach for estimating the eyelids curve detections FIG. 9 relates to eyelid detection and shows a picture of an eye 86 with an obscuration by an upper eyelid 87 and possible obscuration with a lower eyelid 88. This Figure illustrates a resulting output of a following process.

A weighting scheme may also be introduced to assess the obscuration amount of the eyelids, eyelashes or other manner of obscuration such as glass, a frame, and so forth. The obscuration may be assessed by computing the integral of the area between the eyelid curve and pupil boundary with the following equation, $$m_o = \int_{\Theta_1 \to \Theta_2} (r(\theta) - r_p(\theta))d\theta \ge \eta_o \quad (2)$$

where $\theta_i$ represents the angles associated with the boundary curve of the eyelash/eyelid, and $r_p(\theta)$ is the estimated pupil radius at angle $\theta$. The integral may be evaluated over the angular range covered by eyelashes (and/or eyelids) and be based upon the value of the integral with respect to a pre-estimated threshold. A weighting factor may be assigned to these angular segments to be used in the matching function.

Once the iris region is successfully segmented using the POSE technique, the next stage may be to extract the valid sclera and iris boundary points and fit these edge points into a predefined regular shape, e.g., a circular shape. It is important to note that these regular shapes are generally not used as the final outcome of the detection. The regular shapes may be used for guiding the present normalization process and to keep the actual detected edges of the active contour that POSE has identified.

The normalization is crucial to iris processing to address dimensional changes of the iris shapes. These dimensional inconsistencies may be mainly due to the iris stretches and dilation of the pupil that usually undergoes different environment lightings as well as imaging distance variations. The regular shape is not meant to be the final outcome of the present estimates. The curve detected by the present active contour approach as an ensemble of all edges detected by POSE may be the final estimate of the iris outer border edges. The predefined shape may be used to scale back the curve shape into a common scaling for normalization purposes as well as an approach to identify areas that do not belong to the iris map and ought to be masked from the analysis. The regular shape may define the actual scaling needed to bring uniformity among all the captured images and templates in the database. The analytical formula for computing the scaled signal vector of the pixels along the radius variable is shown in the following, $$\tilde{s}_\theta(r) = s_\theta(r) u(R_e - r) + E[s_\theta(r)]_{\theta,r} u(r - R_e), \quad (3)$$

where $s_\theta(r)$ represents the pixel values at a radius r and angle $\theta$. The function $\tilde{s}(r)$ may represent the elements of the scaled vector that is used to map the iris pixels into the normalized iris pattern map (also referred to as a rubber sheet). One may use u(r) to denote the step function. The expected value of the signal function shown in equation (3) represents the expected value edge based upon the fitting model. For circular model, $E[s_\theta(r)] = R_e$ (circular radius).

A challenge in building the standoff iris recognition system may lie at how to extract and segment the boundaries of an iris and not necessarily the compression approach to encode the barcode of the extracted map. To complete the iris recognition process, iris encoding may usually be used to compress the iris map into fewer bits in a barcode to be stored or matched against other barcodes stored in a database. The iris encoding may be processed on the iris map to extract the pattern texture variations. What type of encoding or algorithm may be irrelevant here as there are many COTS approaches to encode a digital image. One may make use of Gabor filters to encode the iris map image to its minimum possible number of bits so that metrics can be used to give one range of values when comparing templates with capture maps. Similarly, any similarity metrics may be used to measure the information similarity among templates. One metric in particular that may be used is the weighted hamming distance (WHD). The WHD may give more weight to the pixels associated with valid edges and less weight to the pixels that are associated with non-valid pixels. The masked pixels may of course be zeroed out during the matching process.

The present system provides a solution to an issue of eye gazing where an individual subject is looking off angle and not straight to the camera system. Gazing effects on iris segmentation may be dramatic and trying to quantify the amount of eye gazing to correct for it may be regarded by many as challenging. A correction process may involve many geometrical models and assumptions that are not general and image specific. The model complexity and its analysis might not only reduce the robustness of the gaze detection estimations but also often introduce errors into the estimates. The present system does not require any gaze detection in that it is designed to deal with all image perspectives.

Figure 10:
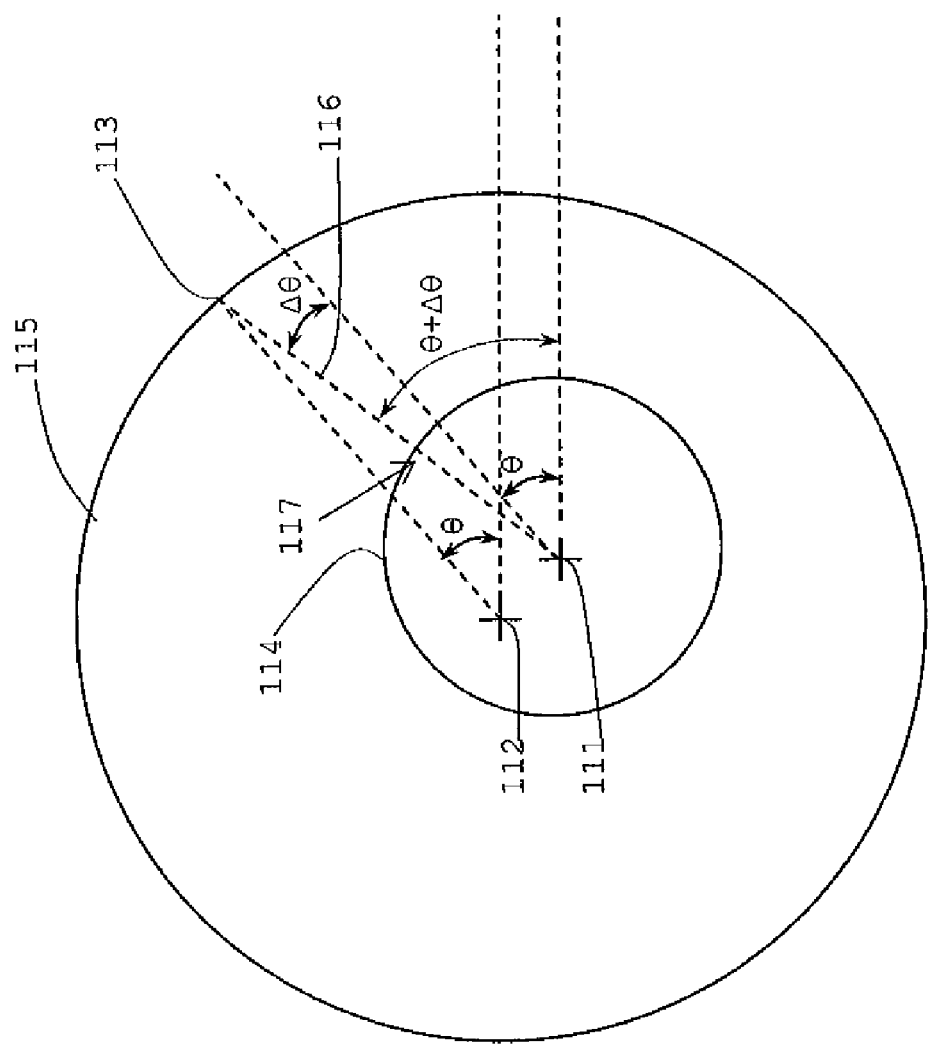
FIG. 10 is a diagram of pupil and iris centers.

In iris feature extraction analysis, for instance, $\theta$ is with respect to a center 111 of a pupil 114, and $\theta + \Delta\theta$ is with respect to the iris center 112, as shown in FIG. 10. The edge point 113 may be on the outside border of the iris 115. One usually needs the iris center to read relative to a corresponding angle. One may measure a distance from the center of the pupil to the edge of the iris. For a point 113 on the iris edge, at each angle, the map pixels are constructed using interpolation scheme to sample a predefined number of pixels at each angle that passes from the inner edge 117 to outer edge 113 with respect to the analysis center 111. The above analysis is applicable whether the fitting model is circular, an ellipse, or a non-linear fitting that may be parameterized (i.e., as a polynomial). One may select fixed size sample vectors from the pupil edge to the iris edge. Or, one may take samples from the pupil edge to the iris at a number of points.

Figure 11:
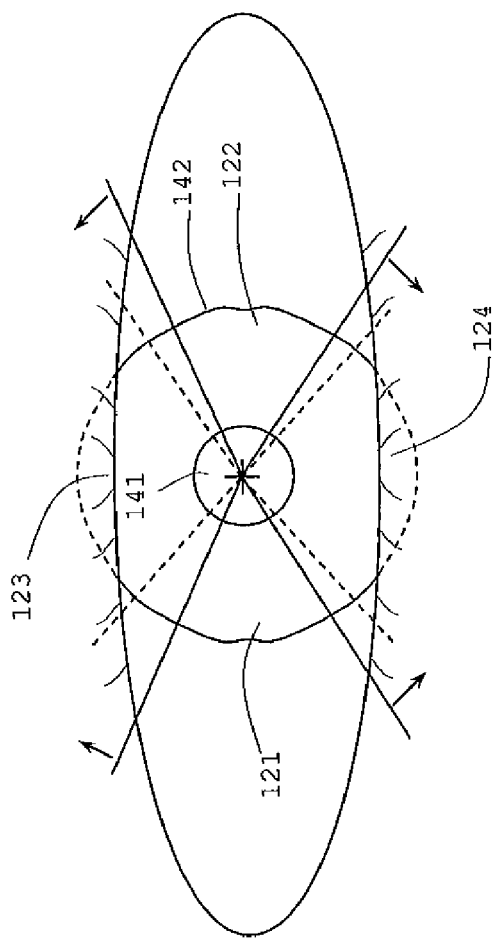
FIGS. 11 and 12 are diagrams of iris quadrants and masking.
Figure 12:
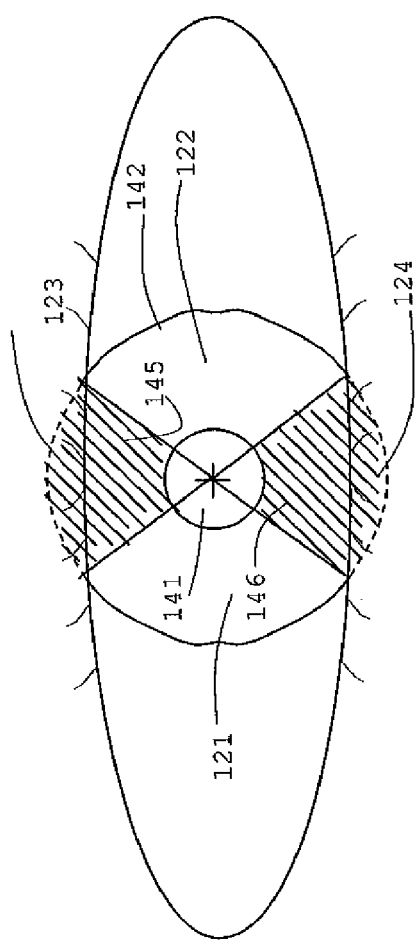

FIG. 11 is a diagram of angular clustering where a focus is on the sclera, that is, the side portions 121 and 122 of the iris 142. One may start at an estimated edge and end up at a new edge. To start, the sclera portions 121 and 122 may appear symmetrical but probably will not end up as such in actuality. Each angle of the quadrants or portions may have a distinct value. The noisy portions at the top 123 and the bottom 124 may be treated differently than the side sclera portions 121 and 122. If the upper and lower portions 123 and 124, respectively, are too discontinuous or noisy, then they may be masked down through the iris 142 to the center of the pupil 141, as shown in FIG. 12.

FIG. 13 is a mapping 131 showing the noisy upper 123 and lower 124 portions relative to pupil 141 and iris 142. In a mapping 132 FIG. 14, one may attempt to use information in the iris 142 the within a radius 133 of the iris 142 that does not extend into the portions 123 and 124. The mapping 151 of FIG. 15 shows a masking 145 and 146 that is complete from portions 123 and 124, respectively, through the iris 142 to the center of the pupil 141, as shown in FIG. 12. Since much information in the iris 142 may not be available as shown by the masking of FIGS. 12 and 15, a partial masking 147 and 148 of portions 123 and 124 may done according to a mapping 152 as shown in FIG. 16. Masking could be used right on the edges of the noisy pixels and therefore masking only those pixels that represent 124 and 123. Mapping 152 may make more iris information available.

Figure 17:
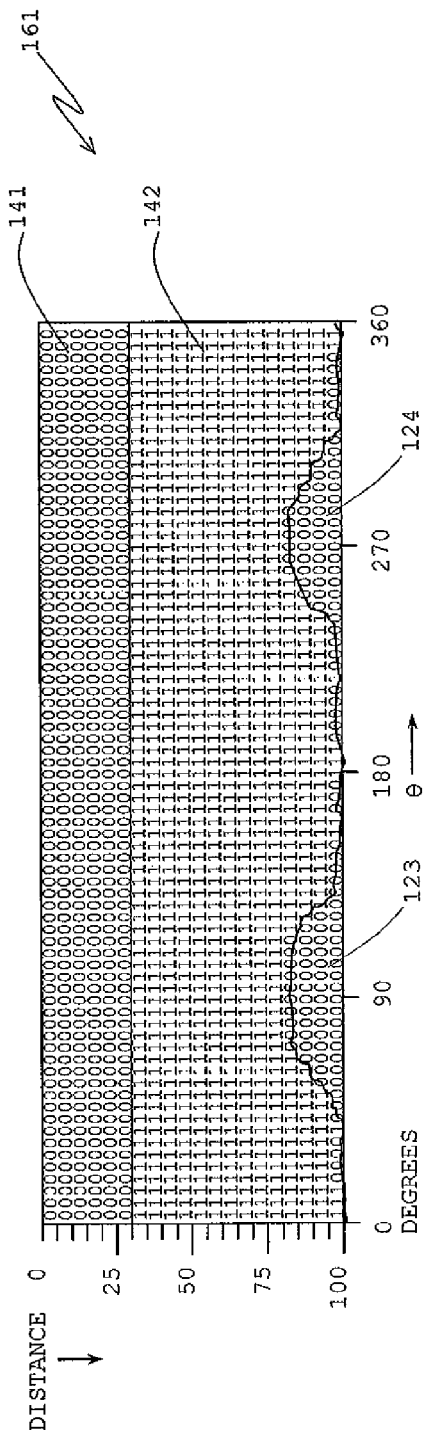
Figure 18:
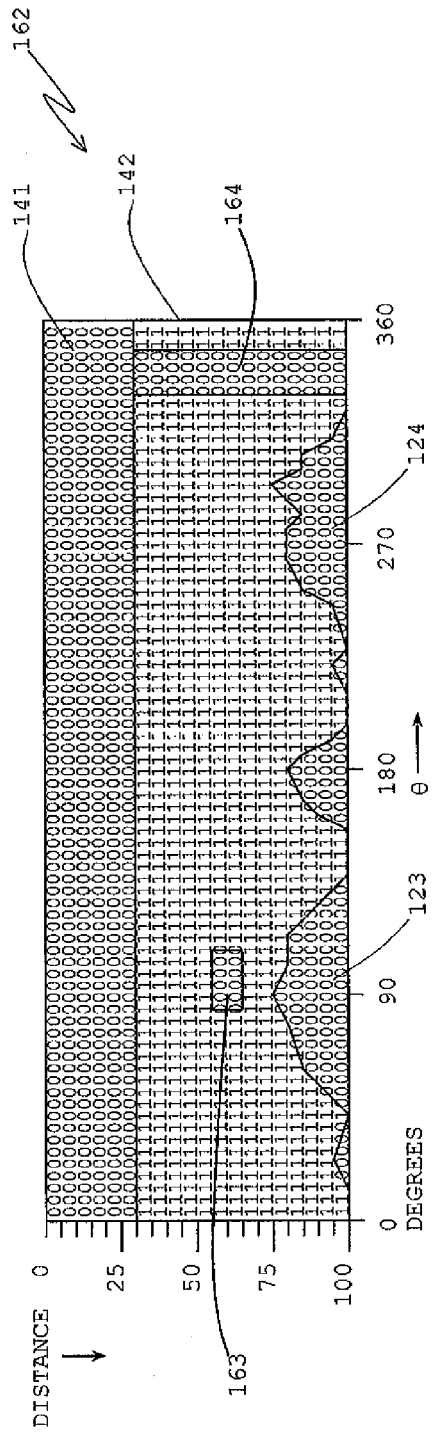

FIG. 17 is a masking 161 of iris 142 showing the masking out of only the portions 123 and 124, plus some other minor noise, with zeros. Ones represent areas of iris information. FIG. 18 shows a masking 162 showing various masking schemes of noisy or obscured areas of the iris 142, such as a reflection 163, blurriness or obscuration 164, and other iris non-information spots near portions 123 and 124. The ones and zeros are merely approximations of example masks (for instance, the ones can be replaced with weights based upon the segmentation analysis as explained herein) as they are for illustrative purposes.

In the present specification, some of the matter may be of a hypothetical or prophetic nature although stated in another manner or tense.

Although the invention has been described with respect to at least one illustrative example, many variations and modifications will become apparent to those skilled in the art upon reading the present specification. It is therefore the intention that the appended claims be interpreted as broadly as possible in view of the prior art to include all such variations and modifications.

What is claimed is:

1. A non-transitory computer readable medium containing instructions that, when executed by a computer, provides an iris recognition system comprising:
   an eyefinder;
   a filter connected to the eyefinder;
   a range module connected to the filter for setting a cluster angular range;
   a segmenter connected to the range determiner, wherein the segmenter is a one dimensional polar plus segmentation module and comprises:
      a first one dimensional polar segmenter, for sclera borders, connected to the range module;
      a second one dimensional polar segmenter, for eyelash/lid borders, connected to the range module;
      a first get max peak module connected to the first one dimensional polar segmenter;
      a second get max peak module connected to the second one dimensional polar segmenter;

a first one dimensional median filter connected to the first get max peak module and to the border module; and a second one dimensional median filter connected to the second get max peak module and to the border module;

a border module connected to the segmenter;

a count module connected to the border module; and a curve fitter connected to the count module.

2. The non-transitory computer readable medium of claim 1, wherein:

the eyefinder is for providing a valid eye image having a processed pupil border; and the filter is for smoothing out edges in the eye image.

3. The non-transitory computer readable medium of claim 1, further containing instructions such that the iris recognition system further comprises a kernel module, for selecting an image of an iris in the eye image, connected to the filter.

4. The non-transitory computer readable medium of claim 1, further containing instructions such that the iris recognition system further comprises a map analysis module connected to the count module, the curve fitter and the segmenter.

5. A non-transitory computer readable medium containing instructions that, when executed by a computer, provides an iris recognition system comprising:

an eyefinder for providing a valid eye image having a processed pupil border;

a filter connected to the eyefinder for smoothing out edges in the eye image;

a range module connected to the filter;

a segmenter connected to the range determiner;

a border module connected to the segmenter, the border module comprising a sclera border module and an eyelash/lid border module;

a count module connected to the border module, wherein the count module is for determining a number of discontinuities in sclera borders, and further wherein the count module is for determining a number of discontinuities in the eyelash/lid borders; and a curve fitter connected to the count module;

wherein:

if the number of discontinuities in the sclera borders is less than a first threshold, then the curve fitter is activated for curve fitting the sclera borders; and if the number of discontinuities in the sclera borders is not less than the first threshold, then the eye image is invalid.

6. The non-transitory computer readable medium of claim 5, further containing instructions such that the iris recognition system further comprises a kernel module, for selecting an image of an iris in the eye image, connected to the filter.

7. The non-transitory computer readable medium of claim 5, further containing instructions such that the iris recognition system further comprises a map analysis module connected to the count module, the curve fitter and the segmenter.

8. The non-transitory computer readable medium of claim 5, wherein:

the range module is for setting a cluster angular range; and the segmenter is a one dimensional polar plus segmentation module.

9. The non-transitory computer readable medium of claim 5, wherein:

if the number of discontinuities in the eyelash/lid borders is greater than a second threshold, then the eyelash/lid borders are masked; and if the number of discontinuities in the eyelash/lid borders is not greater than the second threshold, then the eyelash/lid borders are extracted.

10. A method for iris recognition comprising providing an image of an eye to a processor, the processor being configured to perform the steps of:

selecting a pupil in the image;

segmenting the pupil;

determining a validity of portions of a border of the pupil;

fitting a curve on at least invalid portions of the border of the pupil to form a resulting border of the pupil;

selecting an iris with the pupil having the resulting border from the image of the eye;

clustering iris sclera boundaries and the eyelash/lid boundaries of the iris into first and second groups of boundaries, respectively; and determining a first number of discontinuities of the first group of boundaries; wherein:

if the first number is less than a first threshold, then the first group of boundaries is fitted with a curve fitting model; and if the first number is not less than the first threshold, then the eye image is invalid.

11. The method of claim 10, wherein the processor is further configured to perform the step of:

determining a second number of discontinuities of the second group of boundaries; and further wherein:

if the second number is not greater than a second threshold, then the second group of boundaries is extracted;

if the second number is not greater than the second threshold and an area between outer borders of the second group of boundaries and an inner border of the iris is less than a third threshold, then the second group of boundaries are weighted accordingly; and if the second number is greater than the second threshold, then the second group of boundaries is masked; and further comprising mapping the iris.

12. The method of claim 10, wherein the processor is further configured to perform the step of constructing an iris map based upon actual inner and outer edge estimates with respect to fitting models.

13. The method of claim 12, wherein the processor is further configured such that pixels of the iris map are extracted based upon an interpolation of image pixels within inner fitting model and outer fitting model edges at nearly all angles, deemed to be valid, with respect to a pupil center.

14. The method of claim 12, wherein the processor is further configured such that nearly any pixel that lies within an outer border of the iris and a fitting model shape may be masked.

15. The method of claim 12, wherein the processor is further configured such that nearly any pixel that lies outside an outer fitting model shape may be discarded.

* * * * *